US012019575B2

(12) United States Patent
Calvin et al.

(10) Patent No.: US 12,019,575 B2
(45) Date of Patent: *Jun. 25, 2024

(54) SWITCH FABRIC HAVING A SERIAL COMMUNICATIONS INTERFACE AND A PARALLEL COMMUNICATIONS INTERFACE

(71) Applicant: Analog Devices, Inc., Wilmington, MA (US)

(72) Inventors: James G. Calvin, Attleboro, MA (US); Albert Rooyakkers, Sunnyvale, CA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,270

(22) Filed: Aug. 17, 2021

(65) Prior Publication Data

US 2022/0035759 A1    Feb. 3, 2022

Related U.S. Application Data

(63) Continuation of application No. 16/853,555, filed on Apr. 20, 2020, now Pat. No. 11,093,427, which is a
(Continued)

(51) Int. Cl.
*G06F 13/40* (2006.01)
*G06F 13/20* (2006.01)
(Continued)

(52) U.S. Cl.
CPC .......... *G06F 13/4022* (2013.01); *G06F 13/20* (2013.01); *G06F 13/364* (2013.01);
(Continued)

(58) Field of Classification Search
CPC ...... G06F 13/4022; G06F 13/20; G06F 15/16; G06F 13/364; G06F 13/4282;
(Continued)

(56) References Cited

U.S. PATENT DOCUMENTS 1,778,549 A    10/1930  Conner
1,961,013 A    5/1934   Battista et al.
(Continued)

FOREIGN PATENT DOCUMENTS

CN    2162746 Y    4/1994
CN    1408129 A    4/2003
(Continued)

OTHER PUBLICATIONS

Office Action for Japanese Application No. 2014-159475, dated Feb. 15, 2019.
(Continued)

*Primary Examiner* — Henry Tsai
*Assistant Examiner* — Christopher A Daley
(74) *Attorney, Agent, or Firm* — Kevin E. West; Advent, LLP

(57) ABSTRACT

A switch fabric is disclosed that includes a serial communications interface and a parallel communications interface. The serial communications interface is configured for connecting a plurality of slave devices to a master device in parallel to transmit information between the plurality of slave devices and the master device, and the parallel communications interface is configured for separately connecting the plurality of slave devices to the master device to transmit information between the plurality of slave devices and the master device, and to transmit information between individual ones of the plurality of slave devices. The parallel communications interface may comprise a dedicated parallel communications channel for each one of the plurality of
(Continued)

slave devices. The serial communications interface may comprise a multidrop bus, and the parallel communications interface may comprise a cross switch.

13 Claims, 10 Drawing Sheets

Related U.S. Application Data continuation of application No. 15/801,589, filed on Nov. 2, 2017, now Pat. No. 10,628,361, which is a continuation of application No. 15/460,844, filed on Mar. 16, 2017, now Pat. No. 9,811,490, which is a continuation of application No. 15/247,998, filed on Aug. 26, 2016, now Pat. No. 9,600,434, which is a continuation of application No. 14/501,974, filed on Sep. 30, 2014, now Pat. No. 9,436,641, which is a continuation of application No. 13/341,161, filed on Dec. 30, 2011, now Pat. No. 8,862,802.

(51) Int. Cl.
*G06F 13/364* (2006.01)
*G06F 13/42* (2006.01)
*G06F 15/16* (2006.01)
*G06F 15/173* (2006.01)

(52) U.S. Cl.
CPC .......... *G06F 13/4282* (2013.01); *G06F 15/16* (2013.01); *G06F 15/17312* (2013.01); *G06F 2213/0004* (2013.01); *G06F 2213/0022* (2013.01); *G06F 2213/0024* (2013.01)

(58) Field of Classification Search
CPC ....... G06F 15/17312; G06F 2213/0024; G06F 2213/0004; G06F 2213/0022
See application file for complete search history.

(56) References Cited

U.S. PATENT DOCUMENTS

| | | | |
|---|---|---|---|
| 2,540,575 A | 2/1951 | Tomun et al. |
| 3,702,983 A | 11/1972 | Chace et al. |
| 4,079,440 A | 3/1978 | Ohnuma et al. |
| 4,082,984 A | 4/1978 | Iwata |
| 4,337,499 A | 6/1982 | Cronin et al. |
| 4,403,286 A | 9/1983 | Fry et al. |
| 4,508,414 A | 4/1985 | Kusui et al. |
| 4,628,308 A | 12/1986 | Robert |
| 4,656,622 A | 4/1987 | Lea |
| 4,672,529 A | 6/1987 | Kupersmit |
| 4,679,193 A | 7/1987 | Jensen et al. |
| 4,691,384 A | 9/1987 | Jobe |
| 4,789,792 A | 12/1988 | Ruedi |
| 4,882,702 A | 11/1989 | Struger et al. |
| 4,929,939 A | 5/1990 | Varma et al. |
| 4,932,892 A | 6/1990 | Hatch |
| 5,013,247 A | 5/1991 | Watson |
| 5,128,664 A | 7/1992 | Bishop |
| 5,229,652 A | 7/1993 | Hough |
| 5,325,046 A | 6/1994 | Young et al. |
| 5,378,166 A | 1/1995 | Gallagher, Sr. |
| 5,385,487 A | 1/1995 | Beitman |
| 5,385,490 A | 1/1995 | Demeter et al. |
| 5,388,099 A | 2/1995 | Poole |
| 5,422,558 A | 6/1995 | Stewart |
| 5,469,334 A | 11/1995 | Balakrishnan |
| 5,519,583 A | 5/1996 | Kolling et al. |
| 5,546,463 A | 8/1996 | Caputo et al. |
| 5,572,511 A | 11/1996 | Ouyang et al. |
| 5,590,284 A | 12/1996 | Crosetto |
| 5,602,754 A | 2/1997 | Beatty et al. |
| 5,603,044 A | 2/1997 | Annapareddy et al. |
| 5,719,483 A | 2/1998 | Abbott et al. |
| 5,724,349 A | 3/1998 | Cloonan et al. |
| 5,735,707 A | 4/1998 | O'Groske et al. |
| 5,757,795 A | 5/1998 | Schnell |
| 5,773,962 A | 6/1998 | Nor |
| 5,860,824 A | 1/1999 | Fan |
| 5,896,473 A | 4/1999 | Kaspari |
| 5,909,368 A | 6/1999 | Nixon et al. |
| 5,951,666 A | 9/1999 | Ilting et al. |
| 5,958,030 A | 9/1999 | Kwa |
| 5,963,448 A | 10/1999 | Flood et al. |
| 5,980,312 A | 11/1999 | Chapman et al. |
| 6,002,675 A | 12/1999 | Ben-Michael et al. |
| 6,009,410 A | 12/1999 | Lemole et al. |
| 6,016,310 A | 1/2000 | Muller et al. |
| 6,046,513 A | 4/2000 | Jouper et al. |
| 6,104,913 A | 8/2000 | McAllister |
| 6,124,778 A | 9/2000 | Rowley et al. |
| 6,178,474 B1 | 1/2001 | Hamano et al. |
| 6,218,740 B1 | 4/2001 | Mildice |
| 6,219,789 B1 | 4/2001 | Little et al. |
| 6,220,889 B1 | 4/2001 | Ely et al. |
| 6,347,963 B1 | 2/2002 | Falkenberg et al. |
| 6,393,565 B1 | 5/2002 | Lockhart et al. |
| 6,435,409 B1 | 8/2002 | Hu |
| 6,453,416 B1 | 9/2002 | Epstein |
| 6,480,963 B1 | 11/2002 | Tachibana et al. |
| 6,490,176 B2 | 12/2002 | Holzer et al. |
| 6,574,681 B1 | 6/2003 | White et al. |
| 6,597,683 B1 | 7/2003 | Gehring et al. |
| 6,643,777 B1 | 11/2003 | Chu |
| 6,680,904 B1 | 1/2004 | Kaplan et al. |
| 6,695,620 B1 | 2/2004 | Huang |
| 6,714,541 B1 | 3/2004 | Iyer et al. |
| 6,799,234 B1 | 9/2004 | Moon et al. |
| 6,812,803 B2 | 11/2004 | Goergen |
| 6,814,580 B2 | 11/2004 | Li et al. |
| 6,828,894 B1 | 12/2004 | Sorger et al. |
| 6,840,795 B1 | 1/2005 | Takeda et al. |
| 6,956,355 B2 | 10/2005 | Vaillancourt et al. |
| 6,988,162 B2 | 1/2006 | Goergen |
| 6,991,467 B1 | 1/2006 | Cheng et al. |
| 7,114,070 B1 | 9/2006 | Willming et al. |
| 7,164,255 B2 | 1/2007 | Hui |
| 7,172,428 B2 | 2/2007 | Huang |
| 7,200,692 B2 | 4/2007 | Singla et al. |
| 7,234,963 B1 | 6/2007 | Huang |
| 7,254,452 B2 | 8/2007 | Davlin et al. |
| 7,399,209 B2 | 7/2008 | Kodaira |
| 7,402,074 B2 | 7/2008 | Leblanc et al. |
| 7,415,368 B2 | 8/2008 | Gilbert et al. |
| 7,426,585 B1 | 9/2008 | Rourke |
| 7,460,482 B2 | 12/2008 | Pike |
| 7,510,420 B2 | 3/2009 | Mori |
| 7,526,676 B2 | 4/2009 | Chou et al. |
| 7,529,862 B2 | 5/2009 | Isani et al. |
| 7,536,548 B1 | 5/2009 | Batke et al. |
| 7,554,288 B2 | 6/2009 | Gangstoe et al. |
| 7,587,481 B1 | 9/2009 | Osburn, III |
| 7,614,909 B2 | 11/2009 | Lin |
| 7,619,386 B2 | 11/2009 | Sasaki et al. |
| 7,622,994 B2 | 11/2009 | Galal |
| 7,660,998 B2 | 2/2010 | Walmsley |
| 7,670,190 B2 | 3/2010 | Shi et al. |
| 7,685,349 B2 | 3/2010 | Allen et al. |
| 7,730,304 B2 | 6/2010 | Katsube et al. |
| 7,746,846 B2 | 6/2010 | Boora et al. |
| 7,761,640 B2 | 7/2010 | Hikabe |
| 7,774,074 B2 | 8/2010 | Davlin et al. |
| 7,788,431 B2 | 8/2010 | Deshpande et al. |
| 7,790,304 B2 | 9/2010 | Hendricks et al. |
| 7,811,136 B1 | 10/2010 | Hsieh et al. |
| 7,815,471 B2 | 10/2010 | Wu |
| 7,822,994 B2 | 10/2010 | Hamaguchi |
| 7,839,025 B2 | 11/2010 | Besser et al. |
| 7,872,561 B2 | 1/2011 | Matumoto |
| 7,948,758 B2 | 5/2011 | Buhler et al. |
| 7,960,870 B2 | 6/2011 | Besser et al. |
| 7,971,052 B2 | 6/2011 | Lucas et al. |

(56) References Cited

U.S. PATENT DOCUMENTS

| | | |
|---|---|---|
| 8,013,474 B2 | 9/2011 | Besser et al. |
| 8,019,194 B2 | 9/2011 | Morrison et al. |
| 8,032,745 B2 | 10/2011 | Bandholz et al. |
| 8,062,070 B2 | 11/2011 | Jeon et al. |
| 8,125,208 B2 | 2/2012 | Gyland |
| 8,132,231 B2 | 3/2012 | Amies et al. |
| 8,143,858 B2 | 3/2012 | Tsugawa et al. |
| 8,149,587 B2 | 4/2012 | Baran et al. |
| 8,157,569 B1 | 4/2012 | Liu |
| 8,181,262 B2 | 5/2012 | Cooper et al. |
| 8,189,101 B2 | 5/2012 | Cummings et al. |
| 8,212,399 B2 | 7/2012 | Besser et al. |
| 8,266,360 B2 | 9/2012 | Agrawal |
| 8,281,386 B2 | 10/2012 | Milligan et al. |
| 8,287,306 B2 | 10/2012 | Daugherty et al. |
| 8,295,770 B2 | 10/2012 | Seil et al. |
| 8,310,380 B2 | 11/2012 | Aria et al. |
| 8,341,717 B1 | 12/2012 | Delker et al. |
| 8,380,905 B2 | 2/2013 | Djabbari et al. |
| 8,390,441 B2 | 3/2013 | Covaro et al. |
| 8,465,762 B2 | 6/2013 | Lee et al. |
| 8,480,438 B2 | 7/2013 | Mattson |
| 8,532,119 B2 | 9/2013 | Snively et al. |
| 8,560,147 B2 | 10/2013 | Taylor et al. |
| 8,587,318 B2 | 11/2013 | Chandler et al. |
| 8,651,874 B2 | 2/2014 | Ku et al. |
| 8,677,145 B2 | 3/2014 | Maletsky et al. |
| 8,694,770 B1 | 4/2014 | Osburn, III |
| 8,777,671 B2 | 7/2014 | Huang |
| 8,862,802 B2 | 10/2014 | Calvin et al. |
| 8,868,813 B2 | 10/2014 | Calvin et al. |
| 8,971,072 B2 | 3/2015 | Calvin et al. |
| 9,071,082 B2 | 6/2015 | Nishibayashi et al. |
| 9,318,917 B2 | 4/2016 | Kubota et al. |
| 9,436,641 B2 | 9/2016 | Calvin et al. |
| 9,465,762 B2 | 10/2016 | Calvin et al. |
| 9,467,297 B2 | 10/2016 | Clish et al. |
| 9,812,803 B2 | 11/2017 | Toyoda et al. |
| 9,843,149 B1 | 12/2017 | Irbe et al. |
| 10,103,875 B1 | 10/2018 | Roth et al. |
| 10,613,567 B2 | 4/2020 | Rooyakkers et al. |
| 10,832,861 B2 | 11/2020 | Rooyakkers et al. |
| 11,046,260 B2 | 6/2021 | Sekino et al. |
| 11,093,427 B2 * | 8/2021 | Calvin ............... G06F 13/4282 |
| 2002/0070835 A1 | 6/2002 | Dadafshar |
| 2002/0080828 A1 | 6/2002 | Ofek et al. |
| 2002/0080829 A1 | 6/2002 | Ofek et al. |
| 2002/0084698 A1 | 7/2002 | Kelly et al. |
| 2002/0086678 A1 | 7/2002 | Salokannel et al. |
| 2002/0095573 A1 | 7/2002 | O'Brien |
| 2002/0097031 A1 | 7/2002 | Cook et al. |
| 2002/0116619 A1 | 8/2002 | Maruyama et al. |
| 2002/0124198 A1 | 9/2002 | Bormann et al. |
| 2002/0171525 A1 | 11/2002 | Kobayashi et al. |
| 2002/0182898 A1 | 12/2002 | Takahashi et al. |
| 2002/0189910 A1 | 12/2002 | Yano et al. |
| 2003/0005289 A1 | 1/2003 | Gougeon et al. |
| 2003/0013727 A1 | 1/2003 | Maw et al. |
| 2003/0040897 A1 | 2/2003 | Murphy et al. |
| 2003/0074489 A1 | 4/2003 | Steger et al. |
| 2003/0094855 A1 | 5/2003 | Lohr et al. |
| 2003/0105601 A1 | 6/2003 | Kobayashi et al. |
| 2003/0137277 A1 | 7/2003 | Mori et al. |
| 2003/0166397 A1 | 9/2003 | Aura |
| 2003/0202330 A1 | 10/2003 | Lopata et al. |
| 2003/0204756 A1 | 10/2003 | Ransom et al. |
| 2003/0236998 A1 | 12/2003 | Gilstrap et al. |
| 2004/0178770 A1 | 9/2004 | Gagnon et al. |
| 2005/0001589 A1 | 1/2005 | Edington et al. |
| 2005/0019143 A1 | 1/2005 | Bishman |
| 2005/0091432 A1 | 4/2005 | Adams et al. |
| 2005/0102535 A1 | 5/2005 | Patrick et al. |
| 2005/0144437 A1 | 6/2005 | Ransom et al. |
| 2005/0144440 A1 | 6/2005 | Catherman et al. |
| 2005/0151720 A1 | 7/2005 | Cruz-Hernandez et al. |
| 2005/0162019 A1 | 7/2005 | Masciarelli et al. |
| 2005/0182876 A1 | 8/2005 | Kim et al. |
| 2005/0189910 A1 | 9/2005 | Hui |
| 2005/0198522 A1 | 9/2005 | Shaw et al. |
| 2005/0229004 A1 | 10/2005 | Callaghan |
| 2006/0015590 A1 | 1/2006 | Patil et al. |
| 2006/0020782 A1 | 1/2006 | Kakii |
| 2006/0108972 A1 | 5/2006 | Araya |
| 2006/0119315 A1 | 6/2006 | Sasaki et al. |
| 2006/0155990 A1 | 7/2006 | Katsube et al. |
| 2006/0156415 A1 | 7/2006 | Rubinstein et al. |
| 2007/0072442 A1 | 3/2007 | Difonzo et al. |
| 2007/0076768 A1 | 4/2007 | Chiesa et al. |
| 2007/0091886 A1 | 4/2007 | Davis et al. |
| 2007/0123304 A1 | 5/2007 | Pattenden et al. |
| 2007/0123316 A1 | 5/2007 | Little |
| 2007/0143838 A1 | 6/2007 | Milligan et al. |
| 2007/0174524 A1 | 7/2007 | Kato et al. |
| 2007/0177298 A1 | 8/2007 | Jaatinen et al. |
| 2007/0192134 A1 | 8/2007 | Littenberg et al. |
| 2007/0194944 A1 | 8/2007 | Galera et al. |
| 2007/0214296 A1 | 9/2007 | Takamatsu et al. |
| 2007/0229302 A1 | 10/2007 | Penick et al. |
| 2007/0260897 A1 | 11/2007 | Cochran et al. |
| 2007/0286234 A1 | 12/2007 | Gutman et al. |
| 2008/0067874 A1 | 3/2008 | Tseng |
| 2008/0077976 A1 | 3/2008 | Schulz |
| 2008/0080395 A1 | 4/2008 | Law et al. |
| 2008/0082449 A1 | 4/2008 | Wilkinson et al. |
| 2008/0123669 A1 | 5/2008 | Oliveti et al. |
| 2008/0140888 A1 | 6/2008 | Blair et al. |
| 2008/0181316 A1 | 7/2008 | Crawley et al. |
| 2008/0189441 A1 | 8/2008 | Jundt et al. |
| 2008/0194124 A1 | 8/2008 | Di |
| 2008/0209216 A1 | 8/2008 | Kelly et al. |
| 2008/0285755 A1 | 11/2008 | Camus et al. |
| 2008/0303351 A1 | 12/2008 | Jansen et al. |
| 2009/0036164 A1 | 2/2009 | Rowley |
| 2009/0061678 A1 | 3/2009 | Minoo et al. |
| 2009/0066291 A1 | 3/2009 | Tien et al. |
| 2009/0083843 A1 | 3/2009 | Wilkinson, Jr. et al. |
| 2009/0091513 A1 | 4/2009 | Kuhn |
| 2009/0092248 A1 | 4/2009 | Rawson |
| 2009/0121704 A1 | 5/2009 | Shibahara |
| 2009/0204458 A1 | 8/2009 | Wiese et al. |
| 2009/0217043 A1 | 8/2009 | Metke et al. |
| 2009/0222885 A1 | 9/2009 | Batke et al. |
| 2009/0234998 A1 | 9/2009 | Kuo |
| 2009/0239468 A1 | 9/2009 | He et al. |
| 2009/0245245 A1 | 10/2009 | Malwankar et al. |
| 2009/0254655 A1 | 10/2009 | Kidwell et al. |
| 2009/0256717 A1 | 10/2009 | Iwai |
| 2009/0278509 A1 | 11/2009 | Boyles et al. |
| 2009/0287321 A1 | 11/2009 | Lucas et al. |
| 2009/0288732 A1 | 11/2009 | Gielen |
| 2010/0052428 A1 | 3/2010 | Imamura et al. |
| 2010/0066340 A1 | 3/2010 | Delforge |
| 2010/0082869 A1 | 4/2010 | Lloyd et al. |
| 2010/0122081 A1 | 5/2010 | Sato et al. |
| 2010/0148721 A1 | 6/2010 | Little |
| 2010/0149997 A1 | 6/2010 | Law et al. |
| 2010/0151816 A1 | 6/2010 | Besehanic et al. |
| 2010/0153751 A1 | 6/2010 | Tseng et al. |
| 2010/0197366 A1 | 8/2010 | Pattenden et al. |
| 2010/0197367 A1 | 8/2010 | Pattenden et al. |
| 2010/0233889 A1 | 9/2010 | Kiani et al. |
| 2010/0262312 A1 | 10/2010 | Kubota et al. |
| 2011/0010016 A1 | 1/2011 | Giroti |
| 2011/0038114 A1 | 2/2011 | Pance et al. |
| 2011/0057291 A1 | 3/2011 | Slupsky et al. |
| 2011/0066309 A1 | 3/2011 | Matsuoka et al. |
| 2011/0074349 A1 | 3/2011 | Ghovanloo |
| 2011/0080056 A1 | 4/2011 | Low et al. |
| 2011/0082621 A1 | 4/2011 | Berkobin et al. |
| 2011/0089900 A1 | 4/2011 | Hogari |
| 2011/0140538 A1 | 6/2011 | Jung et al. |
| 2011/0150431 A1 | 6/2011 | Klappert |
| 2011/0172940 A1 | 7/2011 | Wood et al. |
| 2011/0185196 A1 | 7/2011 | Asano et al. |

(56) References Cited

U.S. PATENT DOCUMENTS

| | | |
|---|---|---|
| 2011/0196997 A1 | 8/2011 | Ruberg et al. |
| 2011/0197009 A1 | 8/2011 | Agrawal |
| 2011/0202992 A1 | 8/2011 | Xiao et al. |
| 2011/0285847 A1 | 11/2011 | Riedel et al. |
| 2011/0291491 A1 | 12/2011 | Lemmens et al. |
| 2011/0296066 A1 | 12/2011 | Xia |
| 2011/0313547 A1 | 12/2011 | Hernandez et al. |
| 2012/0028498 A1 | 2/2012 | Na et al. |
| 2012/0036364 A1 | 2/2012 | Yoneda et al. |
| 2012/0046015 A1 | 2/2012 | Little |
| 2012/0053742 A1 | 3/2012 | Tsuda |
| 2012/0102334 A1 | 4/2012 | O'Loughlin et al. |
| 2012/0124373 A1 | 5/2012 | Dangoor et al. |
| 2012/0143586 A1 | 6/2012 | Vetter et al. |
| 2012/0159210 A1 | 6/2012 | Hosaka |
| 2012/0204033 A1 | 8/2012 | Etchegoyen et al. |
| 2012/0236769 A1 | 9/2012 | Powell et al. |
| 2012/0242459 A1 | 9/2012 | Lambert |
| 2012/0265361 A1 | 10/2012 | Billingsley et al. |
| 2012/0271576 A1 | 10/2012 | Kamel et al. |
| 2012/0274273 A1 | 11/2012 | Jacobs et al. |
| 2012/0282805 A1 | 11/2012 | Ku et al. |
| 2012/0284354 A1 | 11/2012 | Mukundan et al. |
| 2012/0284514 A1 | 11/2012 | Lambert |
| 2012/0295451 A1 | 11/2012 | Hyun-Jun et al. |
| 2012/0297101 A1 | 11/2012 | Neupaertl et al. |
| 2012/0311071 A1 | 12/2012 | Karaffa et al. |
| 2012/0322513 A1 | 12/2012 | Pattenden et al. |
| 2012/0328094 A1 | 12/2012 | Pattenden et al. |
| 2013/0011719 A1 | 1/2013 | Yasui et al. |
| 2013/0026973 A1 | 1/2013 | Luke et al. |
| 2013/0031382 A1 | 1/2013 | Jau et al. |
| 2013/0070788 A1 | 3/2013 | Deiretsbacher et al. |
| 2013/0082641 A1 | 4/2013 | Nishibayashi et al. |
| 2013/0170258 A1 | 7/2013 | Calvin et al. |
| 2013/0173832 A1 | 7/2013 | Calvin et al. |
| 2013/0211547 A1 | 8/2013 | Buchdunger et al. |
| 2013/0212390 A1 | 8/2013 | Du et al. |
| 2013/0224048 A1 | 8/2013 | Gillingwater et al. |
| 2013/0233924 A1 | 9/2013 | Burns |
| 2013/0244062 A1 | 9/2013 | Teramoto et al. |
| 2013/0290706 A1 | 10/2013 | Socky et al. |
| 2013/0291085 A1 | 10/2013 | Chong et al. |
| 2014/0015488 A1 | 1/2014 | Despesse |
| 2014/0068712 A1 | 3/2014 | Frenkel et al. |
| 2014/0075186 A1 | 3/2014 | Austen |
| 2014/0089692 A1 | 3/2014 | Hanafusa |
| 2014/0091623 A1 | 4/2014 | Shippy et al. |
| 2014/0095867 A1 | 4/2014 | Smith et al. |
| 2014/0097672 A1 | 4/2014 | Takemura et al. |
| 2014/0129162 A1 | 5/2014 | Hallman et al. |
| 2014/0131450 A1 | 5/2014 | Gordon et al. |
| 2014/0142725 A1 | 5/2014 | Boyd |
| 2014/0280520 A1 | 9/2014 | Baier et al. |
| 2014/0285318 A1 | 9/2014 | Audéon et al. |
| 2014/0312913 A1 | 10/2014 | Kikuchi et al. |
| 2014/0327318 A1 | 11/2014 | Calvin et al. |
| 2014/0335703 A1 | 11/2014 | Calvin et al. |
| 2014/0341220 A1 | 11/2014 | Lessmann |
| 2015/0019790 A1 | 1/2015 | Calvin et al. |
| 2015/0046701 A1 | 2/2015 | Rooyakkers et al. |
| 2015/0048684 A1 | 2/2015 | Rooyakkers et al. |
| 2015/0115711 A1 | 4/2015 | Kouroussis et al. |
| 2015/0303729 A1 | 10/2015 | Kasai et al. |
| 2015/0365240 A1 | 12/2015 | Callaghan |
| 2016/0036098 A1 | 2/2016 | Washiro |
| 2016/0065656 A1 | 3/2016 | Patin et al. |
| 2016/0069174 A1 | 3/2016 | Cannan et al. |
| 2016/0141894 A1 | 5/2016 | Beaston |
| 2016/0172635 A1 | 6/2016 | Stimm et al. |
| 2016/0224048 A1 | 8/2016 | Rooyakkers et al. |
| 2016/0301695 A1 | 10/2016 | Trivelpiece et al. |
| 2020/0310480 A1 | 10/2020 | Rooyakkers et al. |
| 2021/0109161 A1 | 4/2021 | Huot-Marchand et al. |

FOREIGN PATENT DOCUMENTS

| | | |
|---|---|---|
| CN | 1440254 A | 9/2003 |
| CN | 2596617 Y | 12/2003 |
| CN | 1571335 A | 1/2005 |
| CN | 1702582 A | 11/2005 |
| CN | 1839581 A | 9/2006 |
| CN | 1864305 A | 11/2006 |
| CN | 2899151 Y | 5/2007 |
| CN | 101005359 A | 7/2007 |
| CN | 101069407 A | 11/2007 |
| CN | 101262401 A | 9/2008 |
| CN | 101322089 A | 12/2008 |
| CN | 101349916 A | 1/2009 |
| CN | 101447861 A | 6/2009 |
| CN | 101533380 A | 9/2009 |
| CN | 101576041 A | 11/2009 |
| CN | 201515041 U | 6/2010 |
| CN | 101809557 A | 8/2010 |
| CN | 201590580 U | 9/2010 |
| CN | 101919139 A | 12/2010 |
| CN | 101977104 A | 2/2011 |
| CN | 102035220 A | 4/2011 |
| CN | 102123031 A | 7/2011 |
| CN | 102236329 A | 11/2011 |
| CN | 102237680 A | 11/2011 |
| CN | 202205977 U | 4/2012 |
| CN | 102480352 A | 5/2012 |
| CN | 1934766 B | 6/2012 |
| CN | 102546707 A | 7/2012 |
| CN | 102809950 A | 12/2012 |
| CN | 102812578 A | 12/2012 |
| CN | 103064032 A | 4/2013 |
| CN | 203180248 U | 9/2013 |
| CN | 103376766 A | 10/2013 |
| CN | 103682883 A | 3/2014 |
| CN | 103701919 A | 4/2014 |
| CN | 203645015 U | 6/2014 |
| CN | 104025387 A | 9/2014 |
| CN | 203932181 U | 11/2014 |
| CN | 104185969 A | 12/2014 |
| CN | 104297691 A | 1/2015 |
| CN | 104505894 A | 4/2015 |
| CN | 204243110 U | 4/2015 |
| CN | 105278327 A | 1/2016 |
| CN | 105556762 A | 5/2016 |
| CN | 104025387 B | 7/2018 |
| DE | 102013213550 A1 | 1/2015 |
| EP | 0473336 A2 | 3/1992 |
| EP | 0507360 A2 | 10/1992 |
| EP | 1176616 A2 | 1/2002 |
| EP | 1241800 A1 | 9/2002 |
| EP | 1246563 A1 | 10/2002 |
| EP | 1571559 A1 | 9/2005 |
| EP | 1877915 A2 | 1/2008 |
| EP | 1885085 A1 | 2/2008 |
| EP | 2179364 A2 | 4/2010 |
| EP | 2317743 A1 | 5/2011 |
| EP | 2450921 A1 | 5/2012 |
| EP | 1396065 B1 | 7/2012 |
| EP | 2557657 A2 | 2/2013 |
| EP | 2557670 A2 | 2/2013 |
| EP | 1885085 B1 | 3/2013 |
| EP | 2613421 A1 | 7/2013 |
| EP | 2777796 A1 | 9/2014 |
| EP | 2806319 A2 | 11/2014 |
| EP | 2966806 A1 | 1/2016 |
| JP | S5974413 U | 5/1984 |
| JP | S59177226 U | 11/1984 |
| JP | H0163190 U | 4/1989 |
| JP | H02164012 A | 6/1990 |
| JP | H04153705 A | 5/1992 |
| JP | H04245411 A | 9/1992 |
| JP | H05346809 A | 12/1993 |
| JP | 07075143 | 3/1995 |
| JP | H0794354 A | 4/1995 |
| JP | H07105328 A | 4/1995 |
| JP | H07320963 A | 12/1995 |
| JP | H0837121 A | 2/1996 |

(56) References Cited

FOREIGN PATENT DOCUMENTS

| | | | |
|---|---|---|---|
| JP | H0898274 | A | 4/1996 |
| JP | H08241824 | A | 9/1996 |
| JP | H08322252 | A | 12/1996 |
| JP | 109182324 | A | 7/1997 |
| JP | H09182324 | A | 7/1997 |
| JP | H09213548 | A | 8/1997 |
| JP | H1189103 | A | 3/1999 |
| JP | H1198215 | A | 4/1999 |
| JP | H1198707 | A | 4/1999 |
| JP | H11230504 | A | 8/1999 |
| JP | H11235044 | A | 8/1999 |
| JP | H11312013 | A | 11/1999 |
| JP | 2000041068 | A | 2/2000 |
| JP | 2000124890 | A | 4/2000 |
| JP | 2000252143 | A | 9/2000 |
| JP | 2001100809 | A | 4/2001 |
| JP | 2001242971 | A | 9/2001 |
| JP | 2001292176 | A | 10/2001 |
| JP | 2001307055 | A | 11/2001 |
| JP | 2002134071 | A | 5/2002 |
| JP | 2002280238 | A | 9/2002 |
| JP | 2002343655 | A | 11/2002 |
| JP | 2002359131 | A | 12/2002 |
| JP | 3370931 | B2 | 1/2003 |
| JP | 2003047912 | A | 2/2003 |
| JP | 2003068543 | A | 3/2003 |
| JP | 2003142327 | A | 5/2003 |
| JP | 2003152703 | A | 5/2003 |
| JP | 2003152708 | A | 5/2003 |
| JP | 2003216237 | A | 7/2003 |
| JP | 2004501540 | A | 1/2004 |
| JP | 2004303701 | A | 10/2004 |
| JP | 2004532596 | A | 10/2004 |
| JP | 2005020759 | A | 1/2005 |
| JP | 2005038411 | A | 2/2005 |
| JP | 2005513956 | A | 5/2005 |
| JP | 2005151720 | A | 6/2005 |
| JP | 2005250833 | A | 9/2005 |
| JP | 2005275777 | A | 10/2005 |
| JP | 2005531235 | A | 10/2005 |
| JP | 2005327231 | A | 11/2005 |
| JP | 2005332406 | A | 12/2005 |
| JP | 2006060779 | A | 3/2006 |
| JP | 2006164706 | A | 6/2006 |
| JP | 2006180460 | A | 7/2006 |
| JP | 2006223950 | A | 8/2006 |
| JP | 2006238274 | A | 9/2006 |
| JP | 2006254650 | A | 9/2006 |
| JP | 2007034711 | A | 2/2007 |
| JP | 2007096817 | A | 4/2007 |
| JP | 2007519150 | A | 7/2007 |
| JP | 2007238696 | A | 9/2007 |
| JP | 2007252081 | A | 9/2007 |
| JP | 2007535235 | A | 11/2007 |
| JP | 2008008861 | A | 1/2008 |
| JP | 2008172873 | A | 7/2008 |
| JP | 2008215028 | A | 9/2008 |
| JP | 2008257707 | A | 10/2008 |
| JP | 2008538668 | A | 10/2008 |
| JP | 4245411 | B2 | 3/2009 |
| JP | 2009054086 | A | 3/2009 |
| JP | 2009065759 | A | 3/2009 |
| JP | 2009157913 | A | 7/2009 |
| JP | 2009163909 | A | 7/2009 |
| JP | 2009538112 | A | 10/2009 |
| JP | 2010011351 | A | 1/2010 |
| JP | 2010503134 | A | 1/2010 |
| JP | 4439340 | B2 | 3/2010 |
| JP | 2010515407 | A | 5/2010 |
| JP | 2010135903 | A | 6/2010 |
| JP | 2010205163 | A | 9/2010 |
| JP | 2010233167 | A | 10/2010 |
| JP | 2010533387 | A | 10/2010 |
| JP | 2011078249 | A | 4/2011 |
| JP | 2011217037 | A | 10/2011 |
| JP | 2011223544 | A | 11/2011 |
| JP | 2012033491 | A | 2/2012 |
| JP | 5013019 | B1 | 8/2012 |
| JP | 2012190583 | A | 10/2012 |
| JP | 2012195259 | A | 10/2012 |
| JP | 2013021798 | A | 1/2013 |
| JP | 2013031358 | A | 2/2013 |
| JP | 2013153596 | A | 8/2013 |
| JP | 2013170258 | A | 9/2013 |
| JP | 2013192389 | A | 9/2013 |
| JP | 5362930 | B1 | 12/2013 |
| JP | 2014507721 | A | 3/2014 |
| JP | 2014080952 | A | 5/2014 |
| JP | 2015023375 | A | 2/2015 |
| JP | 2016021763 | A | 2/2016 |
| JP | 2016512039 | A | 4/2016 |
| JP | 2016149128 | A | 8/2016 |
| JP | 2016527844 | A | 9/2016 |
| JP | 6189479 | B1 | 8/2017 |
| JP | 2019146257 | A | 8/2019 |
| JP | 2020115457 | A | 7/2020 |
| KR | 20020088540 | A | 11/2002 |
| KR | 20050014790 | A | 2/2005 |
| KR | 20060034244 | A | 4/2006 |
| KR | 100705380 | B1 | 4/2007 |
| KR | 100807377 | B1 | 2/2008 |
| KR | 20130039174 | A | 4/2013 |
| TW | 201310344 | A | 3/2013 |
| WO | 0180442 | A2 | 10/2001 |
| WO | 02097946 | A2 | 12/2002 |
| WO | 2005070733 | A1 | 8/2005 |
| WO | 2005081659 | A2 | 9/2005 |
| WO | 2006059195 | A1 | 6/2006 |
| WO | 2007041866 | A1 | 4/2007 |
| WO | 2007148462 | A1 | 12/2007 |
| WO | 2008083387 | A2 | 7/2008 |
| WO | 2009032797 | A2 | 3/2009 |
| WO | 2009142053 | A1 | 11/2009 |
| WO | 2010117082 | A1 | 10/2010 |
| WO | 2011104935 | A1 | 9/2011 |
| WO | 2013031124 | A1 | 3/2013 |
| WO | 2013033247 | A1 | 3/2013 |
| WO | 2013102069 | A1 | 7/2013 |
| WO | 2014061307 | A1 | 4/2014 |
| WO | 2014147896 | A1 | 9/2014 |
| WO | 2014179556 | A1 | 11/2014 |
| WO | 2014179566 | A1 | 11/2014 |
| WO | 2015020633 | A1 | 2/2015 |

OTHER PUBLICATIONS

Office Action for Japanese Application No. 2014-159475, dated Jun. 11, 2018.
Office Action for Japanese Application No. 2016-512039, dated Feb. 5, 2019.
Office Action for Japanese Application No. 2016-512039, dated Jun. 5, 2018.
Office Action for Japanese Application No. 2016-533280, dated Apr. 11, 2018.
Office Action for Japanese Application No. 2016-533280, dated Jan. 7, 2019.
Office Action for Japanese Application No. 2016-533280, dated Jun. 29, 2020.
Office Action for Canadian Application No. 2,920,133, dated Apr. 14, 2016.
Office Action for Canadian Application No. 2,875,515 dated Feb. 10, 2017.
Office Action for Canadian Application No. 2,875,515 dated Jul. 5, 2017.
Office Action for Candian Application No. 2,875,517 dated May 4, 2015.
Office Action for Chinese Application No. 201280065564.2, dated Aug. 3, 2016.
Office Action for Chinese Application No. 20141079995.2, dated Jul. 3, 2019.
Office Action for Chinese Application No. 201610229230.4, dated Mar. 18, 2021.

(56) References Cited

OTHER PUBLICATIONS

Office Action for Chinese Application No. 201711349441.2, dated May 27, 2021.
Office Action for Chinese Application No. 201910660260.4, dated Nov. 18, 2021.
Office Action for Chinese Application No. 2020101058999, dated Sep. 3, 2021.
Office Action for Chinese Application No. 201410802889.5 dated Jul. 26, 2018.
Office Action for Chinese Patent Application No. 201610236358.3, dated Jan. 25, 2021.
Office Action for Chinese Patent Application No. 201610236358.3, dated Jun. 24, 2020.
Office Action for Chinese Patent Application No. 201610236358.3, dated Sep. 4, 2019.
Office Action for EP Application No. 14196409.8 dated Jan. 22, 2018.
Office Action for Japanese Application No. 2014-243830, dated Jun. 29, 2021.
Office Action for Japanese Application No. 2016-021763, dated Jun. 11, 2021.
Office Action for Japanese Application No. 2017-237592, dated Dec. 27, 2021.
Office Action for Japanese Application No. 2020-135564, dated Jul. 20, 2021.
Office Action for Japanese Application No. 2020-135564, dated Mar. 8, 2022.
Office Action for Japanese Application No. 2020-135564, dated Sep. 14, 2022.
Office Action for Japanese Application No. 2021-112729, dated Jun. 27, 2022. .
Office Action for Japanese Application No. 2021-117572, dated Oct. 14, 2022.
Office Action for Japanese Application No. 2016-533280, dated Jun. 28, 2017.
Office Action forChinese Patent Application 201410802889.5, dated Dec. 4, 2019.
Office Action from Chinese Patent Application No. 201610229230.4, dated Jul. 15, 2020.
Office Action from Chinese Patent Application No. 201610229230.4, dated Oct. 24, 2019.
Office Action from EP Application No. 14196406.4, dated Jul. 29, 2019.
Office Action for Chinese Application No. 201280065564.2, dated Feb. 28, 2017.
Office Action for Japanese Application No. 2015-136186, dated Oct. 10, 2019. .
Partial European Search Report in European Application No. 17208183.8, dated Mar. 28, 2018.
Partial Supplementary European Search Report in Application No. 12862174.5, dated Nov. 3, 2015.
Partial European Search Report for European Patent Application No. EP 15175744 Mailed on Jan. 4, 2016, 7 pages.
Partial Search Report for European Application No. 15175744.0, dated Dec. 14, 2015.
Partial Supplementary European Search Report dated Nov. 10, 2015 in Application# EP12862174.5.
Reason for Rejection In Japanese Patent Application No. 2016-533279, dated Aug. 13, 2018.
Reason for Rejection for Japanese Application No. 2015-136186, dated May 7, 2020.
Reason for Rejection for Japanese Application No. 2020-061935, dated Mar. 31, 2021.
Reasons for Rejection for Japanese Application No. 2021-138773, dated Jun. 29, 2022.
Rodrigues A., "SCADA Security Device: Design and Implementation", Master of Science Thesis, Wichita State University, Dec. 2011.

Rodrigues, A., et al., "SCADA security device", Proceedings of the Seventh Annual Workshop on Cyber Security and Information Intelligence Research, CSIIRW '11, Jan. 1, 2011, p. 1, XP055230335, New York, New York, USA.
Roman Kleinerman, Daniel Feldman (May 2011), Power over Ethernet (PoE): An Energy-Efficient Alternative (PDF), Marvell, retrieved Sep. 25, 2018 @ http://www.marvell.com/switching/assets/Marveil-PoE-An-Energy-Efficient-Alternative.pdf (Year: 2011).
Search Report for European Application No. 14196406.4, dated Nov. 4, 2015.
Fang et al., "Application of expert diagnosis system in rechargeable battery," Department of Computer Science, Qinghua University, Beijing, China, vol. 26, No. 3, Jun. 2002.
Final Decision for Rejection for Patent Application No. 2016-021763, dated Jul. 31, 2020.
Final Decision of Rejection and Decision of Dismissal of Amendment for Japanese Application No. 2016-080207, dated Sep. 10, 2021.
Generex System GMBH, "BACS—Battery Analysis & Care System," Aug. 17, 2014 , XP055290320, Retrieved from the Internet: URL :HTTP://web.archive.org/we/2040929060116/http://www.generex.de/generex/download/datasheets/datasheet_BACS_C20_de.pdf.
Generex Systems GMBH, "SACS—Battery Analysis & Care System," Aug. 17, 2014, XP055290320.
Hosseinabady, Mohammad, et al., "Using the inter- and intra-switch regularity in NoC switch testing," Design, Automation & Test in Europe Conference & Exhibition: Nice, France, Apr. 16-20, 2007, IEEE Service Center, Apr. 16, 2007 (XP058290046).
International Search Report and Written Opinion for PCT/US2014/036368, dated Sep. 12, 2014.
International Search Report and Written Opinion dated May 12, 2014 in International Application# PCT/US2013/053721.
International Search Report and Written Opinion of the International Searching Authority Dated Apr. 29, 2013, International Application No. PCT/US2012/072056.
International Search Report for Application No. PCT/US2013/053721 mailed May 12, 2014.
"Introduction to Cryptography," NetWOrk Associates, Inc., PGP 6.5.1, 1990-1999, Retrieved@ [ftp://!ftp.pgpi.org/pub/pgp/6.5/docs/english/IntroToCrypto.pdf] on Mar. 17, 2016, (refer to pp. 16-20).
Japanese Office Action for Application No. JP2014-550508 dated Sep. 15, 2017.
Keith S., et al. "Guide to Industrial Control Systems (ICS) Security," NIST, Special Publication 800-882, Jun. 2011, (refer to pp. 2-1 to 2-10).
Molva, R. Ed et al., "Internet security architecture", Computer Networks, Elsevier Science Publishers B. V., Amsterdam, NL, vol. 31, No. 8, Apr. 23, 1999, pp. 787-804, XP004304518.
Extended European Search Report in European Application No. 17208183.8, dated Jun. 22, 2018.
Notice of Preliminary Rejection for Korean Application No. 10-2016-0015889, dated Jul. 6, 2022.
Notice of Reason for Rejection for Japanese Application No. 2016-080207, dated Feb. 4, 2021.
Notice of Reason for Rejection for Japanese Application No. 2016-080207, dated Jun. 4, 2020.
Notice of Reason for Rejection for Japanese Application No. 2014-243827, dated Feb. 1, 2021.
Notice of Reason for Rejection for Japanese Application No. 2014-243827, dated Jan. 24, 2019.
Notice of Reason for Rejection for Japanese Patent Application No. 2014-243830, dated Jul. 10, 2019.
Notice of Reason for Rejection for Japanese Patent Application No. 2014-243830, dated Sep. 21, 2018 .
Notice of Reason for Rejection for JP Patent Application No. 2018-109151, dated Jun. 25, 2019.
Notice of Reason for Rejection for Patent Application No. 2016-021763, dated Nov. 27, 2019.
Notice of Reason for Rejection for Patent Application No. 2022-002389, dated Nov. 25, 2022.
Notice of Reasons for Rejection dated Jul. 13, 2017 for Japanese Application No. JP2016-533279.

(56) References Cited

OTHER PUBLICATIONS

Notice of Reasons for Rejection dated Mar. 1, 2018 for Japanese Application No. JP2016-533279.
Notice of Reasons for Rejection for Japanese Patent Application No. 2020-035778, dated Apr. 15, 2021.
Notice of Reasons for Rejection for Japanese Patent Application No. 2021-148592, dated Oct. 28, 2022.
Notification of the Second Office Action for Chinese Application No. 201380079514.4, dated Nov. 5, 2018.
Office Action for Canadian Application No. 2,875,515, dated Feb. 17, 2016.
Office Action for Canadian Application No. 2,920,133, dated Jan. 30, 2017.
Office Action for Canadian Application No. 2,920,133, dated Oct. 19, 2016.
Office Action for Chinese Application No. 2015103905202.2, dated Jun. 20, 2018.
Office Action for Chinese Application No. 2015103905202.2, dated Mar. 6, 2019.
Office Action for Chinese Application No. 2015103905202.2, dated Aug. 6, 2019.
Office Action dated Dec. 2, 2016 for JP Application No. 2014-550508.
Office Action dated Feb. 5, 2018 for Chinese Application No. CN201380079514.4.
Office Action for Canadian Application No. 2,875,515, dated Jun. 1, 2016.
Office Action for Canadian Application No. 2,875,515, dated Oct. 6, 2016.
Office Action for Canadian Application No. 2,875,518, dated Apr. 22, 2016.
Office Action for Canadian Application No. 2,875,518, dated Jun. 3, 2015.
Office Action for Chinese Application No. 201280065564.2 dated Oct. 19, 2017.
Office Action for Chinese Application No. 201410383686.7, dated Feb. 23, 2018.
Office Action for Chinese Application No. 201480034066.0, dated May 3, 2017.
Office Action for Chinese AppIn No. 201380079515.9, dated Feb. 25, 2019.
Office Action for Chinese Patent Application 201410802889.5, dated May 7, 2019.
Office Action for Japanese Application No. 2014-080952, dated Jan. 7, 2019.
Office Action for Japanese Application No. 2014-080952, dated May 2, 2018.
Baran, M. et al., "Overcurrent Protection on Voltage-Source-Converter-Based Multiterminal DC Distribution Systems," IEEE Transactions on Power Delivery, vol. 22, No. 1, Jan. 2007, pp. 406-412.
Canadian Office Action for Application No. 2920133 dated Jan. 30, 2017.
Canadian Office Action for Application No. 2920133 dated Oct. 19, 2016.
CGI, White Paper on "Public Key Encryption and Digital Signature: How do they work?", 2004 (refer to pp. 3-4).
Chen, et al., "Active Diagnosability of Discrete Event Systems and its Application to Battery Fault Diagnosis," IEEE Transactions on Control Systems Technology, vol. 22, No. 5, Sep. 2014.
Chinese Office Action for Application No. 201380079515.9 dated Aug. 7, 2018.
Chinese Office Action for Application No. 201380079515.9 dated Nov. 16, 2017.
Chinese Office Action for Application No. 202010105899.9, dated Dec. 3, 2020.
Chinese Office Action for Application No. CN201610239130.X dated Aug. 2, 2017.
Chinese Office Action for Application No. CN201610239130.X dated Feb. 14, 2018.
Chinese Office Action for Application No. 201410383686.7 dated May 31, 2017.
Chinese Office Action for Application No. 201410799473.2, dated Oct. 12, 2018.
Chinese Office Action for Application No. CN201410182071.8 dated Mar. 1, 2017.
D. Dzung, M. Naedele, T. P. Von Hoff and M. Crevatin, "Security for Industrial Communication Systems," in Proceedings of the IEEE, vol. 93, No. 6, pp. 1152-1177, Jun. 2005, doi: 10.11 09/JPROC. 2005.849714. (Year: 2005).
Decision of Rejection for Chinese Application No. 201711349441. 2, dated Jun. 23, 2022.
Decision of Rejection for Japanese Application No. 2014-243830, dated Mar. 18, 2020.
Decision of Rejection for Patent Application No. 2014-243827, dated Nov. 28, 2019.
Decision of Rejection for Chinese Application No. 2015103905202. 2, dated Nov. 5, 2019.
Emerson Process Management, "DeltaV Digital Automation System—System Overview," XP055402326, Jan. 1, 2009, pp. 1-40.
European Search Report for European Application No. 14196406.4, dated Sep. 23, 2015.
European Examination Report for Application No. 14196406.4, dated May 12, 2020.
European Search Report for EP Application No. 14196408.0, dated Nov. 24, 2015.
European Search Report in Application No. 12862174.5, dated Feb. 15, 2016.
European Search Report dated Dec. 2, 2015 for EP Application No. 14196408.0.
European Search Report for Application No. 20173319.3, dated Nov. 24, 2020.
European search report for European Patent Application No. EP14196406 dated Oct. 2, 2015, 6 pages.
European Search Report published Nov. 4, 2015 in Application No. EP14196406.4 .
Examination Report in European Application No. 17208183.8, dated Feb. 27, 2019.
Examination Report for European Application No. 14180106.8, dated Jun. 28, 2017.
Examination Report for European Application No. 14196406.4, dated Mar. 31, 2021.
Examination Report for European Application No. 17178867.2, dated Mar. 13, 2019.
Examination Report for European Application No. 13891327.2, dated Sep. 26, 2018.
Examination Report for European Application No. 16165112.0, dated Apr. 17, 2019.
Examination Report for European Application No. 16165112.0, dated Feb. 16, 2018.
Examination Report for European Patent Application No. 16154943. 1, dated May 16, 2019.
Examination Report for European Patent Application No. 1720883. 8, dated Oct. 29, 2019.
Extended European Search Report for European Patent Application No. EP 14166908 Mailed on Jan. 7, 2015, 10 bages.
Extended European Search Report for 21187809.5, dated Nov. 29, 2021.
Extended European Search Report for Application No. EP14180106. 8, mailed on Aug. 12, 2015.
Extended European Search Report for European Application No. 20150993.2, dated Apr. 29, 2020.
Extended European Search Report for European Application No. 20201408.0, dated Apr. 7, 2021.
Extended European Search Report for European Patent Application No. EP 14196409 Mailed on May 31, 2016, 10pages.
Extended European Search Report for European Patent Application No. EP 16154943 Mailed on Jun. 29, 2016, 9pages.
Extended European Search Report for European Patent Application No. EP 17178867 Mailed on Nov. 2, 2017, 13pages.
Extended European Search Report for European Patent Application No. EP 18176358 Mailed on Sep. 11, 2018, 11 pages.

(56) References Cited

OTHER PUBLICATIONS

Extented European Search Reported for European Application No. 20201403.1, dated Apr. 29, 2021.
Extended Search Report for European Application No. 14180106.8, dated Jul. 13, 2015.
Extented European search report for European Patent Application No. EP16165112 dated Sep. 6, 2016, 12 pages.
Fabien F., "Raspberry Pi + Mihini, Controlling an off-the-grid Electrical Installation, Part I," Apr. 11, 2014, XP055290314.
Extended European Search Report for European Patent Application No. EP 14166908 Mailed on Jan. 7, 2015, 10 pages.
Office Action in Japan for Application No. 2021-160356, dated Dec. 16, 2022.
"Introduction to Cryptography," NetWOrk Associates, Inc., PGP 6.5.1, 1990-1999, Retrieved@ [ftp:/lftp.pgpi.org/pub/pgp/6.5/docs/english/IntroToCrypto.pdf] on Mar. 17, 2016, (refer to pp. 16-20).
Office Action for Chinese Appln No. 201380079515.9, dated Feb. 25, 2019.
Roman Kleinerman, Daniel Feldman (May 2011), Power over Ethernet (PoE): An Energy-Efficient Alternative (PDF), Marvell, retrieved Sep. 25, 2018 @ http://www.marvell.com/switching/assets/Marveii-PoE-An-Energy-Efficient-Alternative.pdf (Year: 2011).
Search Report for European Application No. 16154943.1 dated Jun. 17, 2016.
Search Report for European Application No. 14196409.8, dated May 19, 2016.
Search Report for European Application No. 15175744.0, dated Apr. 26, 2016.
Seimens Ag, "ERTEC400—Enhanced Real-Time Ethernet Controller—Handbuch," XP002637652, Version 1.2.2, Jul. 31, 2010, pp. 1-98.
Siemens Ag: "ERTEC 400 | Enhanced Real-Time Ethernet Controller | Handbuch",No. Version 1.2.2 pp. 1-98, XP002637652, Retrieved from the Internet: URL:http:llcache.automation.siemens.comldnilDUIDUXNDgzNwAA_21631481_HBIERTEC400_Handbuch_V122.pdf [retrieved on May 2, 2011].
Siemens, "Uninterruptible 24 V DC Power Supply High-Performance, communicative and integrated in TIA," Mar. 31, 2015,XP055290324.
Summons to attend oral proceedings for European Application No. 14196409.8, dated Nov. 13, 2019.
Supplementary European Search Report for European Patent Application No. EP 14791210 Mailed on Dec. 16, 2016, 11 pages.
Supplementary Search Report for European Application No. 13890953.6 dated Jan. 26, 2017.
Supplementary Search Report for European Application No. 13891327.2, dated Jan. 10, 2017.
Supplementary Search Report for European Application No. 14791210.9, dated Dec. 6, 2016.
Supplementary European Search Report for European Patent Application No. EP 13890953 Mailed on Feb. 6, 2017, 9 pages.
Zafirovic-Vukotic, M. et al., "Secure SCADA network supporting NERC CIP", Power & Energy Society General Meeting, 2009, PES '09, IEEE, Piscataway, NJ, USA, Jul. 26, 2009, pp. 1-8, XP031538542.
Siemens Ag: "ERTEC 400 | Enhanced Real-Time Ethernet Controller | Handbuch",No. Version 1.2.2 pp. 1-98, XP002637652, Retrieved from the Internet: URL:http:llcache.automation.siemens.comldniiDUIDUxNDgzNwAA_21631481_HBIERTEC400_Handbuch_V122.pdf [retrieved on May 2, 2011].
Decision of Rejection for Japanese Patent Application No. 2021-112729, dated Feb. 6, 2023.
Notice of Preliminary Rejection for Korean Application No. 10-2016-0045717, dated Apr. 18, 2023.
Notice of Reason for Rejection for Patent Application No. 2022-002389, dated Mar. 17, 2023.
Office Action for Chinese Patent Application No. 201711349441.2, dated Mar. 20, 2023.
Decision for Rejection for Japanese Application No. 2021-160356, dated Jun. 22, 2023.
Decision of Dismissal of Amendment for Japanese Application 2021-117572, dated May 12, 2023.
Decision of Reexamination of Chinese Application No. 201711349441.2, dated May 23, 2023.
Decision of Rejection for Japanese Application No. 2021-148592, dated May 10, 2023.
Examination Report for Application No. EP20201403.1, dated Aug. 10, 2023.
Examination Report for European Application No. 21187809.5, dated Jan. 3, 2023.
Extended European Search Report for Application No. 22206775.3, dated May 2, 2023.
Extended European Search Report for European Application No. 22206775.3, dated May 5, 2023.
Luo, X., Ji, X. and Park, M.S., 2010, April. Location privacy against traffic analysis attacks in wireless sensor networks. In 2010 International Conference on Information Science and Applications (pp. 1-6). IEEE. (Year: 2010).
Notice of Final Rejection for Korean Application No. 10-2016-0045717, dated Oct. 17, 2023.
Notice of Reasons for Rejection for Japanese Application No. 2022-092303, dated Aug. 31, 2023.
Shrnatikov, V. and Wang, M. H. Timing Analysis in Low-Latency Mix Networks: Attacks and Defenses. In ESORICS 2006, pp. 18-33 . (Year: 2006).

\* cited by examiner

```
┌─────────────────────────────────────────────────────────────┐
│  1010  CONNECT SLAVE DEVICES TO A MASTER DEVICE IN          │
│  PARALLEL FOR TRANSMITTING INFORMATION BETWEEN THE          │
│       SLAVE DEVICES AND THE MASTER DEVICE                   │
│  ┌───────────────────────────────────────────────────────┐  │
│  │  1012  CONNECT THE SLAVE DEVICES TO THE MASTER DEVICE │  │
│  │               USING A MULTIDROP BUS                   │  │
│  └───────────────────────────────────────────────────────┘  │
└─────────────────────────────────────────────────────────────┘
                              │
┌─────────────────────────────────────────────────────────────┐
│  1020  SEPARATELY CONNECT THE SLAVE DEVICES TO THE MASTER   │
│   DEVICE FOR TRANSMITTING INFORMATION BETWEEN THE SLAVE     │
│    DEVICES AND THE MASTER DEVICE, AND FOR TRANSMITTING      │
│  INFORMATION BETWEEN INDIVIDUAL ONES OF THE SLAVE DEVICES   │
│  ┌───────────────────────────────────────────────────────┐  │
│  │  1022  CONNECT THE SLAVE DEVICES TO THE MASTER DEVICE │  │
│  │                 USING A CROSS SWITCH                  │  │
│  └───────────────────────────────────────────────────────┘  │
└─────────────────────────────────────────────────────────────┘
                              │
┌─────────────────────────────────────────────────────────────┐
│    1030  CONNECT THE SLAVE DEVICES TO A SECOND MASTER       │
│                     DEVICE IN PARALLEL                      │
└─────────────────────────────────────────────────────────────┘
                              │
┌─────────────────────────────────────────────────────────────┐
│  1040  SEPARATELY CONNECT THE SLAVE DEVICES TO THE SECOND   │
│                      MASTER DEVICE                          │
└─────────────────────────────────────────────────────────────┘
```

FIG. 10

SWITCH FABRIC HAVING A SERIAL COMMUNICATIONS INTERFACE AND A PARALLEL COMMUNICATIONS INTERFACE

BACKGROUND

One of the most common communication architectures is the multidrop serial communication bus. A Multidrop Bus (MDB) is a bus in which various components are connected to a common set of electrical connectors. This type of bus architecture typically uses a master device and multiple slave devices that communicate with the master device. An arbitration process is used to determine which component can send information on the MDB at a given instant in time. The other devices are then configured to listen for the data that is intended for them. Peripheral Component Interconnect (PCI) is one type of computer bus multidrop standard, used for attaching hardware devices in a computer. Multidrop buses may also be used with vending machine controllers to communicate with vending machine components, such as coin readers and/or note readers. Redundant multidrop buses can be used to prevent a single failure from interrupting communication between the master device and the slave devices. For example, dual multidrop bus configurations can be used in distributed control systems.

SUMMARY

A switch fabric is disclosed. In one or more implementations, the switch fabric includes a serial communications interface and a parallel communications interface. The serial communications interface is configured to connect a plurality of slave devices to a master device in parallel to transmit information between the plurality of slave devices and the master device. In implementations, the serial communications interface may comprise a multidrop bus. The parallel communications interface is configured to separately connect the plurality of slave devices to the master device to transmit information between the plurality of slave devices and the master device, and to transmit information between individual ones of the plurality of slave devices. The parallel communications interface may comprise a dedicated parallel communications channel for each one of the plurality of slave devices. In implementations, the parallel communications interface may comprise a cross switch.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 10 is a flow diagram illustrating a process for furnishing communication between multiple slave devices and one or more master devices in accordance with example implementations of the present disclosure.

DETAILED DESCRIPTION

Overview

Figure 1:
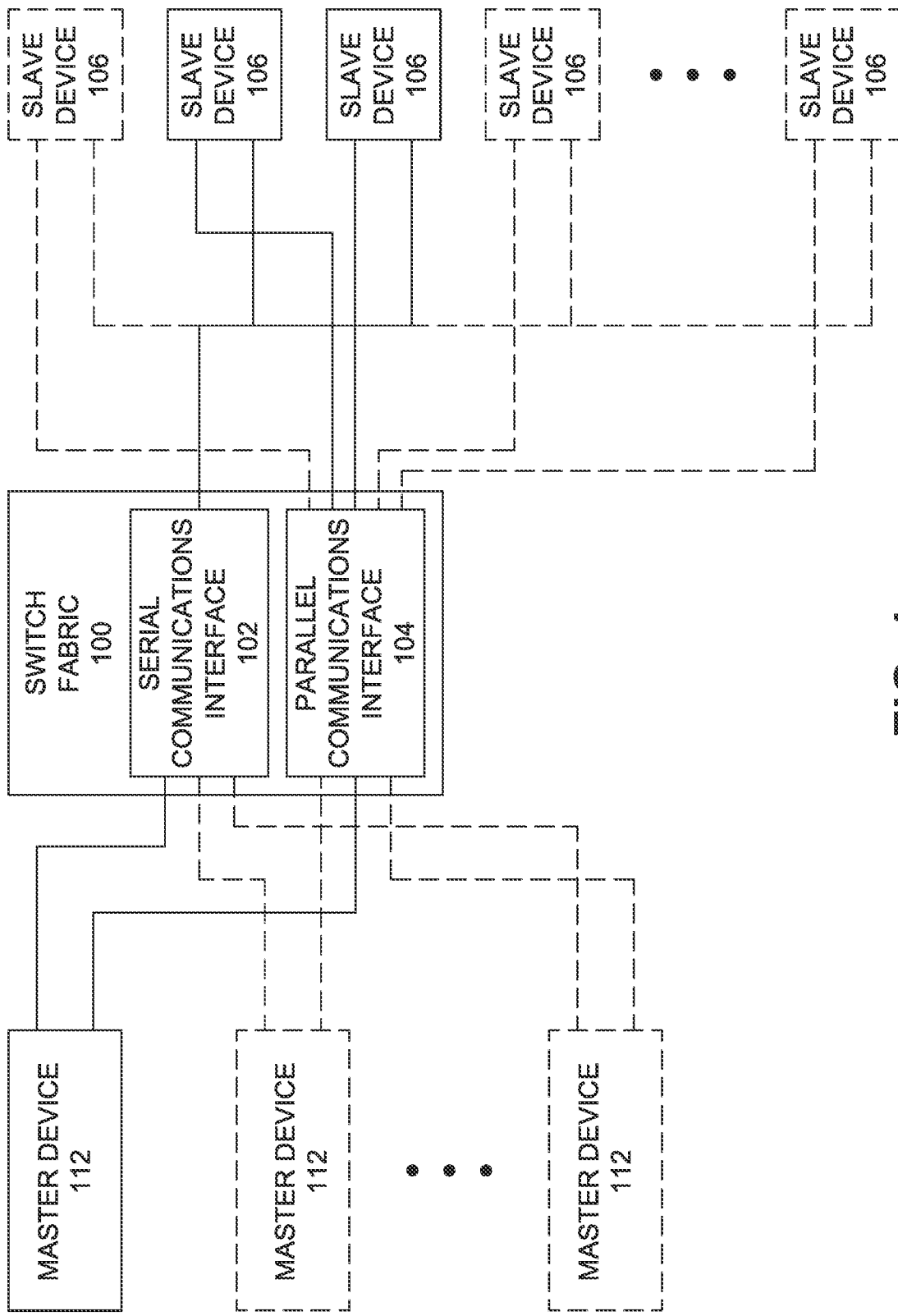
FIG. 1 is a block diagram illustrating a switch fabric in accordance with example implementations of the present disclosure.

In a typical multidrop bus configuration, the master device communicates with the slave devices by polling each slave device one at a time. However, as the number of slave devices increases, the turnaround time for communication increases as well. For example, the total communication turnaround time for a multidrop bus is equal to the sum of each of the times for the master device to send a command to a slave device and receive a response from the slave device, and is thus proportional to the number of slave devices on the network. For high speed control systems applications with many slave devices, this can make communication too slow to be useful. Additionally, this type of bus is half-duplex, and communication between the slave devices further slows the bus and requires complex collision detection. This not only makes the bus slower, but causes the system to be nondeterministic with respect to communication turnaround times, making such a configuration unsuitable for control systems.

Accordingly, a switch fabric is described that has a serial communications interface (e.g., a serial or Multidrop Bus (MDB) with a master device and multiple slave devices) and a parallel communications interface (e.g., a parallel or point-to-point bus implemented using a cross switch, or the like). A switch fabric configured in accordance with the present disclosure may increase communication response time over a standard multidrop architecture. The switch fabric may also provide deterministic communication (e.g., with respect to communication turnaround time) between a master device and slave devices, as well as between the slave devices themselves. Further, the switch fabric may eliminate communication collisions between a master device and the slave devices, as well as eliminating collisions between the slave devices themselves.

In some implementations, the serial communications interface and the parallel communications interface may be formed on a single printed circuit board. The serial communications interface may be configured for connecting the plurality of slave devices to a second master device in parallel, and the parallel communications interface may be configured for separately connecting the plurality of slave devices to the second master device. Information transmitted via the serial communications interface and/or the parallel communications interface may be packetized. The switch fabric may comprise a network interface for transmitting information collected from the plurality of slave devices via a network, and so forth.

A switch assembly is also described that includes a multidrop bus for connecting a plurality of slave devices to a master device in parallel to transmit information between the plurality of slave devices and the master device. The switch assembly also includes a cross switch for separately connecting the plurality of slave devices to the master device to transmit information between the plurality of slave devices and the master device, and to transmit information between individual ones of the plurality of slave devices.

Example Implementations

Figure 2:
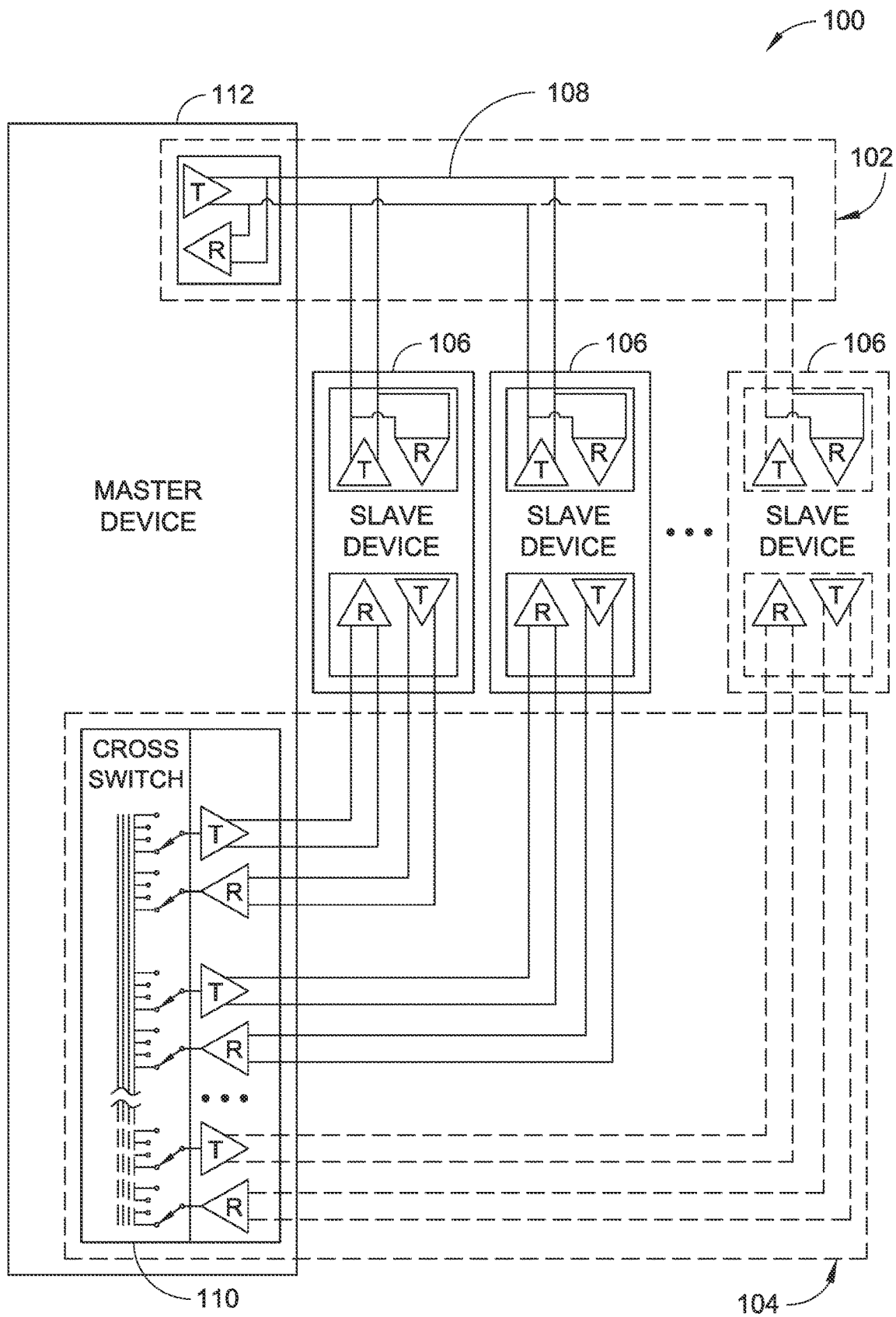
FIG. 2 is a circuit diagram illustrating a switch fabric in accordance with example implementations of the present disclosure.

FIGS. 1 and 2 illustrate an example switch fabric 100 in accordance with example implementations of the present disclosure. In implementations, the switch fabric 100 may be configured for use with any systems technology, such as telecommunications network technology, computer network technology, process control systems technology, and so forth. For example, the switch fabric 100 may be used with a distributed control system comprised of controller elements and subsystems, where the subsystems are controlled by one or more controllers distributed throughout the system. The switch fabric 100 includes a serial communications interface 102 and a parallel communications interface 104 for furnishing communications with a number of slave devices 106. The serial communications interface 102 may be implemented using a group of connectors connected in parallel with one another. For example, the serial communications interface 102 may be implemented using a multidrop bus 108, or the like. In implementations, the multidrop bus 108 may be used for configuration and diagnostic functions of the slave devices 106.

The parallel communications interface 104 allows multiple signals to be transmitted simultaneously over multiple dedicated high speed parallel communication channels. For instance, the parallel communications interface 104 may be implemented using a cross switch 110, or the like. In a particular implementation, as described in FIG. 2, the parallel communications interface 104 can be implemented using a four (4) wire full duplex cross switch 110 with a dedicated connection to each slave device 106. For example, the cross switch 110 can be implemented as a programmable cross switch connecting point-to-point busses and allowing traffic between the slave devices 106.

The cross switch 110 may be configured by a master device 112. For example, the master device 112 may configure one or more sets of registers included in the cross switch 110 to control traffic between the slave devices 106. In implementations, a master device 112 may comprise a rule set dictating how the slave devices 106 are interconnected. For example, a master device 112 may comprise a set of registers, where each register defines the operation of a particular switch (e.g., with respect to how packets are forwarded, and so forth). Thus, the cross switch 110 may not necessarily auto-configure, instead implementing a configuration provided by the master device 112. However, this configuration is provided by way of example only and is not meant to be restrictive of the present disclosure. Thus, in other implementations, the cross switch 110 may auto-configure.

The parallel communications interface 104 may be used for data collection from the slave devices 106. Further, because each slave device 106 has its own private bus to the master (e.g., master device 112), each slave device 106 can communicate with the master at the same time. Thus, the total response time for the switch fabric 100 may be limited to that of the slowest slave device 106, instead of the sum of all slave devices, as previously discussed in relation to a typical multidrop bus.

In implementations, the switch fabric 100, the serial communications interface 102, and the parallel communications interface 104 may be implemented in a single, monolithic circuit board. However, this configuration is provided by way of example only and is not meant to be restrictive of the present disclosure. Thus, the serial communications interface 102 and the parallel communications interface 104 may be implemented using different arrangements of multiple components, such as multiple discrete semiconductor devices for implementing the serial communications interface 102 and the parallel communications interface 104 separately, and so forth.

Referring now to FIGS. 3 through 9, a communications control system 114 using switch fabric 100 is described. The switch fabric 100 may be configured for connecting one or more I/O modules 116 as slave devices and transmitting data to and from the I/O modules 116. The I/O modules 116 may comprise input modules, output modules, and/or input and output modules. For instance, input modules can be used to receive information from input instruments in the process or the field, while output modules can be used to transmit instructions to output instruments in the field. For example, an I/O module 116 can be connected to a process sensor, such as a sensor 118 for measuring pressure in piping for a gas plant, a refinery, and so forth. In implementations, the I/O modules 116 may be used to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

In implementations, the I/O module 116 may be configured to convert analog data received from the sensor 118 to digital data (e.g., using Analog-to-Digital Converter (ADC) circuitry, and so forth). An I/O module 116 may also be connected to a motor 120 and configured to control one or more operating characteristics of the motor 120, such as motor speed, motor torque, and so forth. Further, the I/O module 116 may be configured to convert digital data to analog data for transmission to the motor 120 (e.g., using Digital-to-Analog (DAC) circuitry, and so forth). In implementations, one or more of the I/O modules 116 may comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more of the U/O modules 116 can be used to provide fault tolerant and redundant connections for a communications sub-bus.

Each I/O module 116 may be provided with a unique identifier (ID) for distinguishing one I/O module 116 from another I/O module 116. In implementations, an I/O module 116 may be identified by its ID when it is connected to the communications control system 114. Multiple I/O modules 116 can be used with the communications control system 114 to provide redundancy. For example, two or more I/O modules 116 can be connected to the sensor 118 and/or the motor 120, as described in FIG. 3. Each I/O module 116 can include one or more ports 122 furnishing a physical connection to hardware and circuitry included with the I/O module 116, such as a Printed Circuit Board (PCB) 124, and so forth.

One or more of the I/O modules 116 may include an interface for connecting to other networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 116 may include a connection for connecting an I/O module 116 to a computer bus, and so forth.

The switch fabric 100 may be coupled with one or more communications/control modules 126, which can be used as master devices for monitoring and controlling the I/O modules 116, and for connecting the I/O modules 116 together. The communications/control module(s) 126 may be used to configure the cross switch 110. For example, the communications/control module 126 may update a routing table when an I/O module 116 is connected to the communications control system 114 based upon a unique ID for the I/O module 116. Further, when multiple redundant I/O modules 116 are used, each communications/control module 126 can implement mirroring of informational databases regarding the I/O modules 116 and update them as data is received from and/or transmitted to the I/O modules 116. In some implementations, two or more communications/control modules 126 may be used to provide redundancy.

Data transmitted using the switch fabric 100 may be packetized, i.e., discrete portions of the data may be converted into data packets comprising the data portions along with network control information, and so forth. The switch fabric 100 may use one or more protocols for data transmission, including a bit-oriented synchronous data link layer protocol such as High-Level Data Link Control (HDLC). In a specific instance, the switch fabric 100 may implement HDLC according to an International Organization for Standardization (ISO) 13239 standard, or the like. Further, two or more communications/control modules 126 can be used to implement redundant HDLC. However, it should be noted that HDLC is provided by way of example only and is not meant to be restrictive of the present disclosure. Thus, the communications control system 114 may use other various communications protocols in accordance with the present disclosure.

One or more of the communications/control modules 126 may be configured for exchanging information with components used for monitoring and/or controlling the instrumentation connected to the switch fabric 100 via the I/O modules 116, such as one or more control loop feedback mechanisms/controllers 128. In implementations, a controller 128 can be configured as a microcontroller/Programmable Logic Controller (PLC), a Proportional-Integral-Derivative (PID) controller, and so forth. One or more of the communications/control modules 126 may include a network interface 130 for connecting the communications control system 114 to a controller 128 via a network 132. In implementations, the network interface 130 may be configured as a Gigabit Ethernet interface for connecting the switch fabric 100 to a Local Area Network (LAN). Further, two or more communications/control modules 126 can be used to implement redundant Gigabit Ethernet. However, it should be noted that Gigabit Ethernet is provided by way of example only and is not meant to be restrictive of the present disclosure. Thus, the network interface 130 may be configured for connecting the communications control system 114 to other various networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Additionally, the network interface 130 may be implemented using computer bus. For example, the network interface 130 can include a Peripheral Component Interconnect (PCI) card interface, such as a Mini PCI interface, and so forth. Further, the network 132 may be configured to include a single network or multiple networks across different access points.

Figure 3:
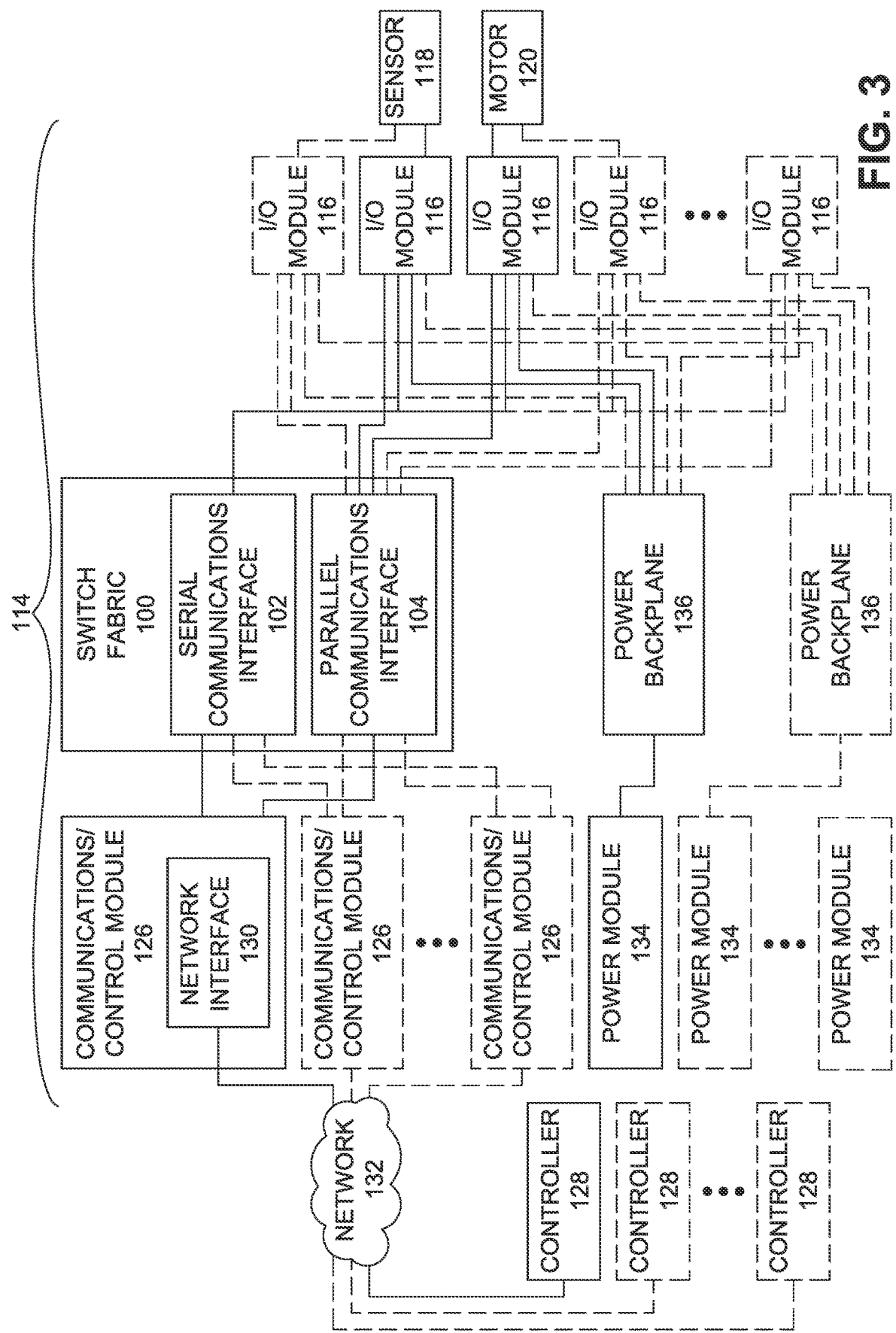
FIG. 3 is a block diagram illustrating a communications control system comprising a switch fabric in accordance with example implementations of the present disclosure.
Figure 4:
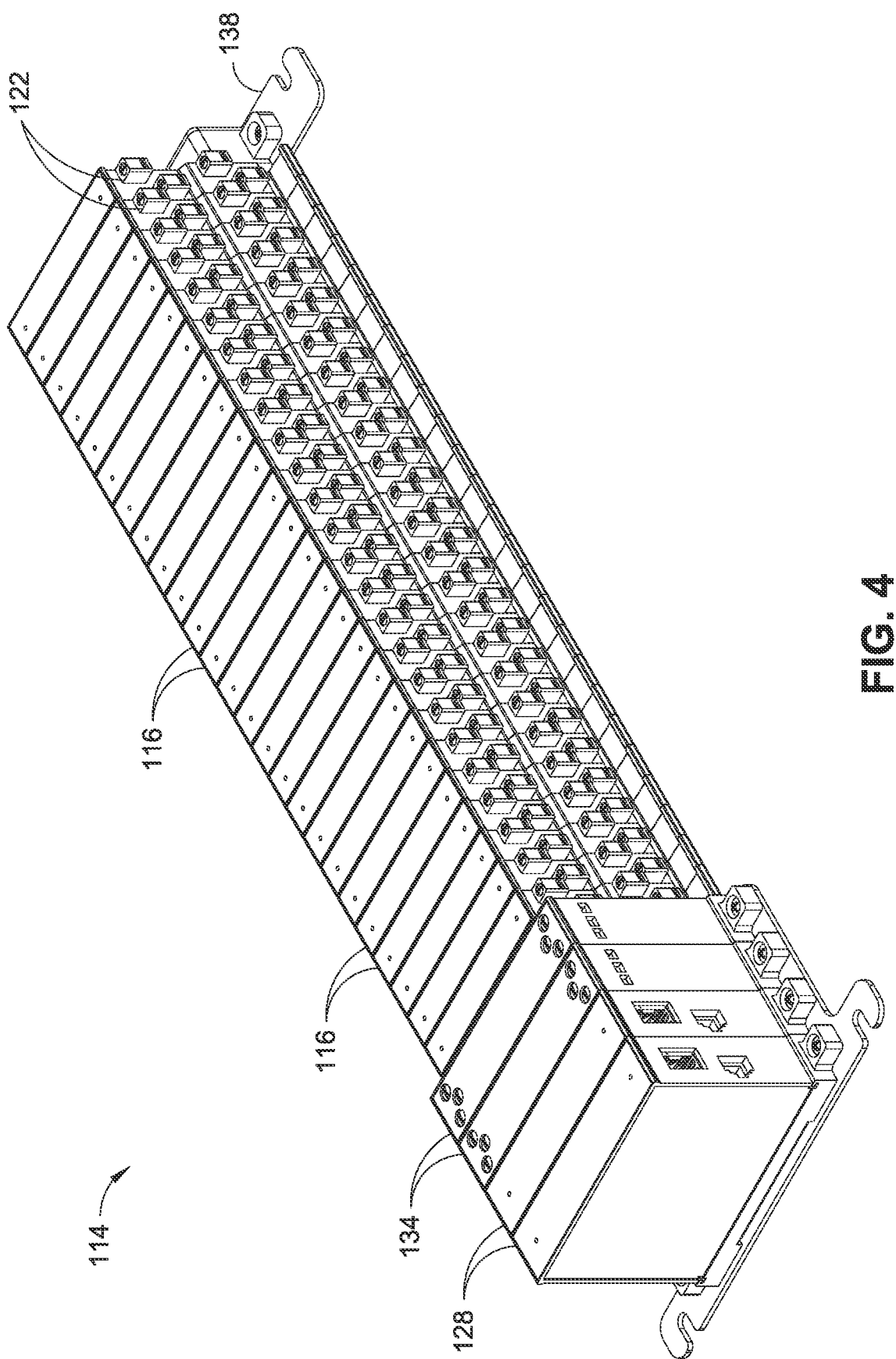
FIG. 4 is an isometric view illustrating a communications control system comprising a switch fabric in accordance with example implementations of the present disclosure.
Figure 5:
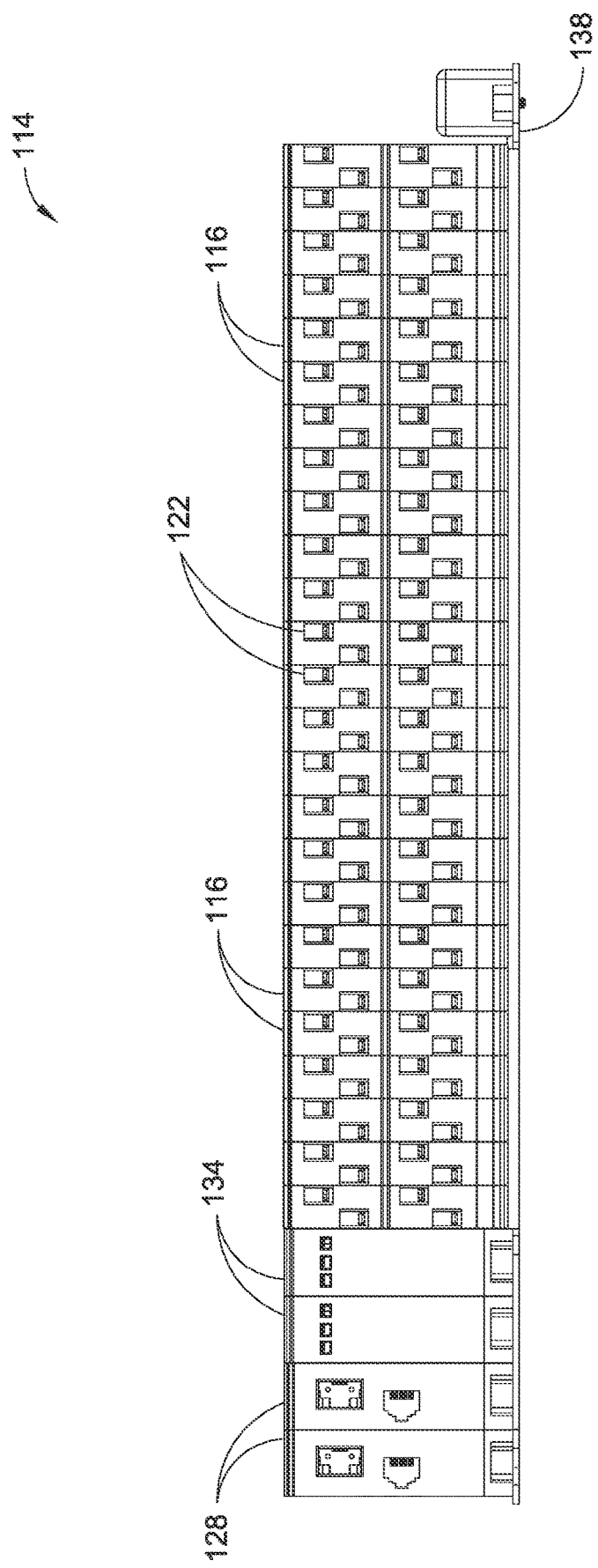
FIG. 5 is a side elevation view of the communications control system illustrated in FIG. 4.
Figure 6:
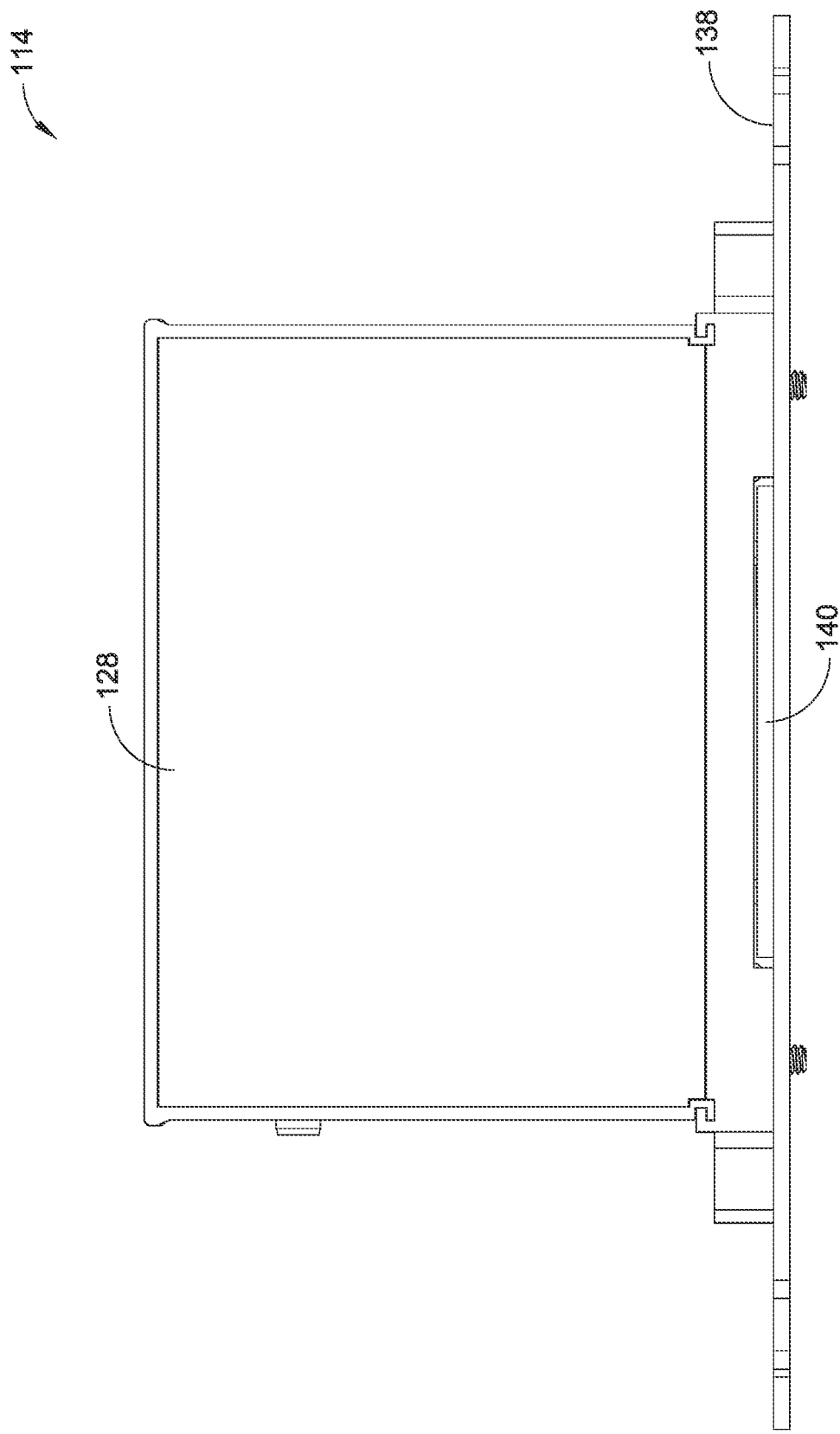
FIG. 6 is an end view of the communications control system illustrated in FIG. 4.
Figure 7:
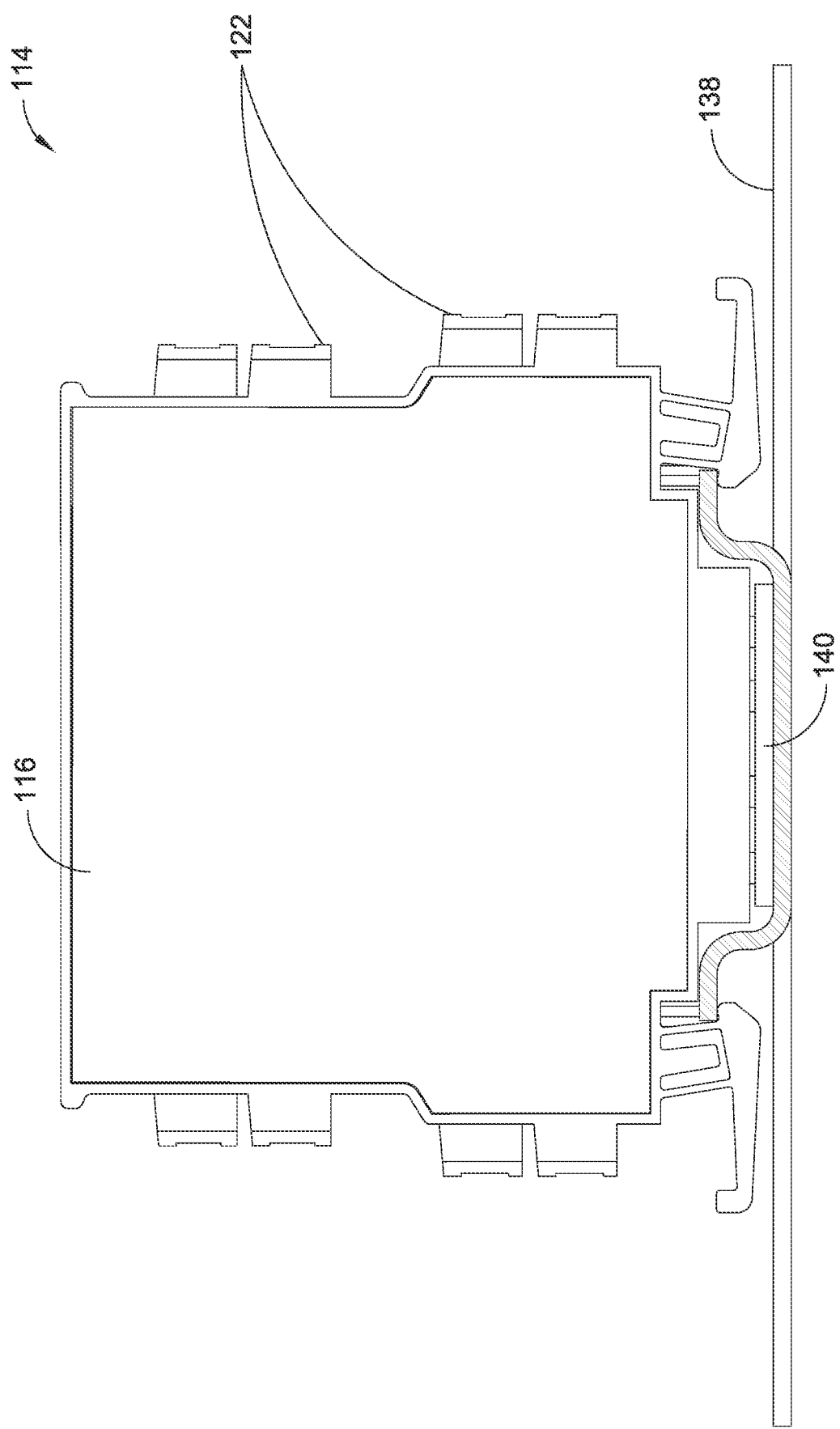
FIG. 7 is a partial cross-sectional end view of the communications control system illustrated in FIG. 4.
Figure 8:
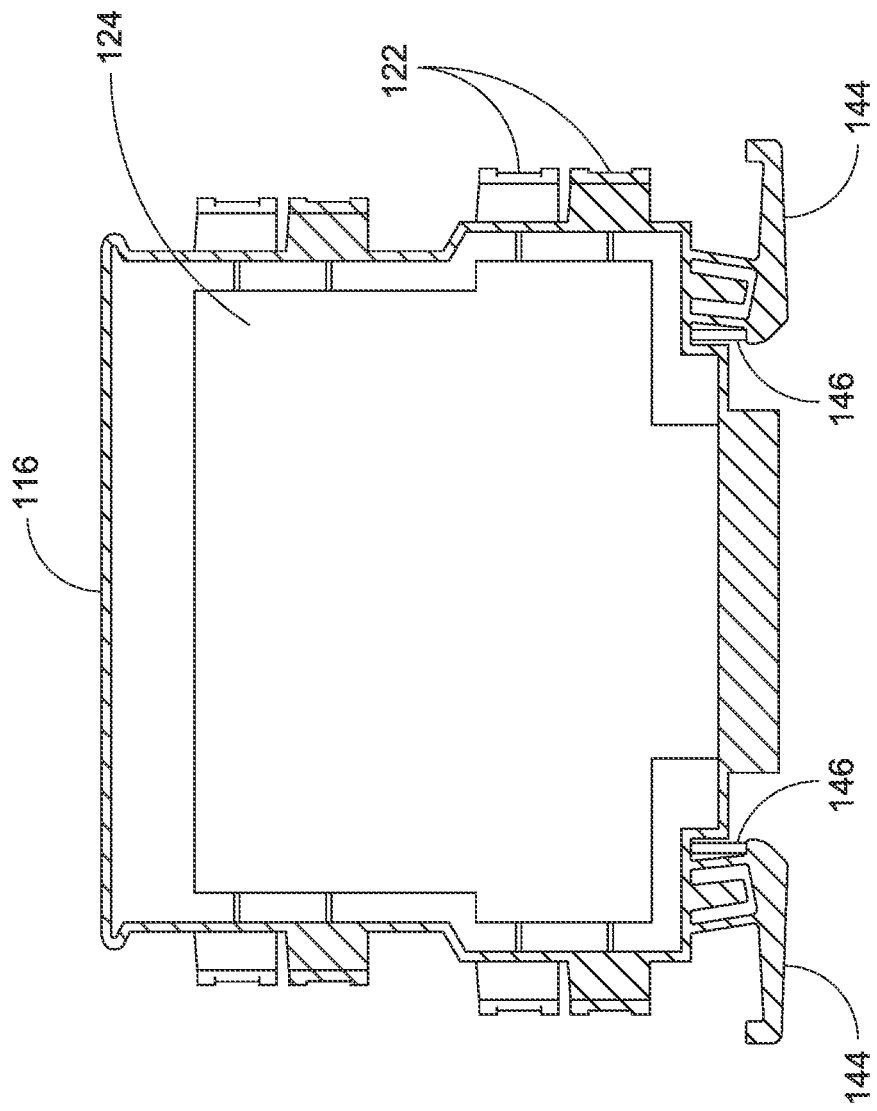
FIG. 8 is a cross-sectional view illustrating an input/output module for the communications control system illustrated in FIG. 4.
Figure 9:
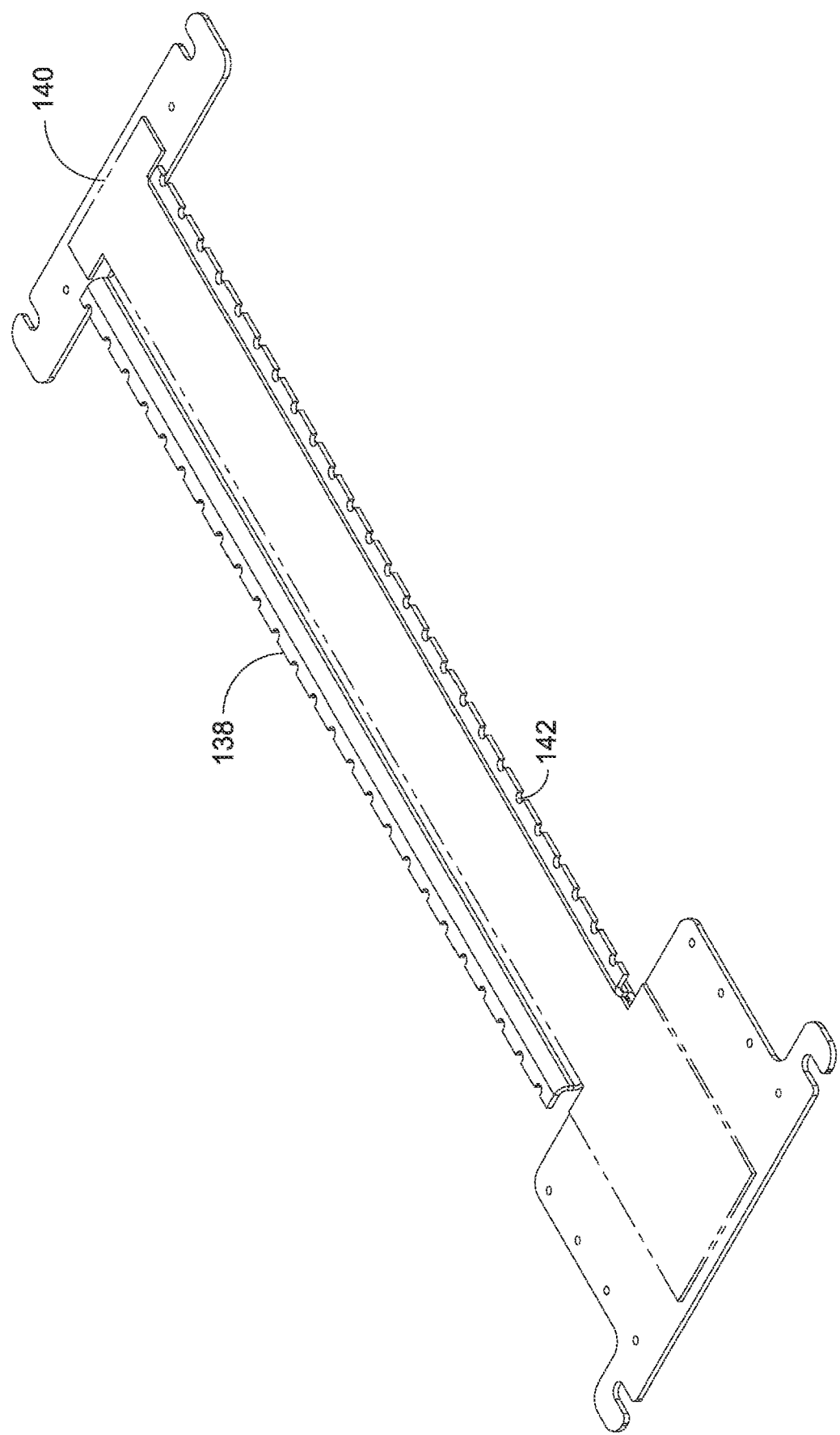
FIG. 9 is an isometric view illustrating a support frame for the communications control system illustrated in FIG. 4.

The communications control system 114 may include one or more power modules 134 for supplying electrical power to field devices via the I/O modules 116. One or more of the power modules 134 may include an AC-to-DC (AC/DC) converter for converting Alternating Current (AC) (e.g., as supplied by AC mains, and so forth) to Direct Current (DC) for transmission to a field device, such as the motor 120 (e.g., in an implementation where the motor 120 comprises a DC motor). Two or more power modules 134 can be used to provide redundancy. For example, as shown in FIG. 3, two power modules 134 can be connected to each of the V/O modules 116 using a separate power backplane 136 for each power module 134.

The communications control system 114 may be implemented using a support frame 138. The support frame 138 may be used to support and/or interconnect the communications/control module(s) 126, the power module(s) 134, the switch fabric 100, the power backplane(s) 136, and/or the I/O modules 116. For example, the switch fabric 100 may be comprised of a circuit board 140, which may be mounted to the support frame 138 using a fastener, such as, for example, double sided tape, adhesive, or mechanical fasteners (screws, bolts, etc.). The support frame 138 may include slots 142 to provide registration for the I/O modules 116, such as for aligning connectors of the I/O modules 116 with connectors included with the circuit board 140 and/or connectors of a power backplane 136. For example, an I/O module 116 may include connectors 144 having tabs/posts 146 for inserting into slots 142 and providing alignment of the I/O module 116 with respect to the circuit board 140. In implementations, one or more of the connectors 144 may be constructed from a thermally conductive material (e.g., metal) connected to a thermal plane of PCB 124 to conduct heat generated by components of the PCB 124 away from the PCB 124 and to the support frame 138, which itself may be constructed of a thermally conductive material (e.g., metal). Further, the communications control system 114 may associate a unique physical ID with each physical slot 142 to uniquely identify each I/O module 116 coupled with a particular slot 142. For example, the ID of a particular slot 142 can be associated with an I/O module 116 coupled with the slot 142 and/or a second ID uniquely associated with the I/O module 116. Further, the ID of a particular I/O module 116 can be used as the ID for a slot 142 when the I/O module 116 is coupled with the slot 142. The support frame 138 can be constructed for cabinet mounting, rack mounting, wall mounting, and so forth.

Example Process

Referring now to FIG. 10, example techniques for furnishing communication between multiple slave devices and one or more master devices using a switch fabric that includes a serial communications interface and a parallel communications interface are described.

FIG. 10 depicts a process 1000, in an example implementation, for furnishing a switch fabric, such as the switch fabric 100 illustrated in FIGS. 1 through 9 and described above. In the process 1000 illustrated, slave devices are connected to a master device in parallel for transmitting information between the slave devices and the master device (Block 1010). In one or more implementations, the slave devices can be connected to the master device using a multidrop bus (Block 1012). For example, with reference to FIG. 2, the serial communications interface 102 of the switch fabric 100 may be implemented using a multidrop bus 108. The slave devices are separately connected to the master device for transmitting information between the slave devices and the master device, and for transmitting information between individual ones of the slave devices (Block 1020). In one or more implementations, the slave devices can be separately connected to the master device using a cross switch (Block 1022). For instance, with continuing reference to FIG. 2, the parallel communications interface 104 of the switch fabric 100 may be implemented using a cross switch 110 comprising a four (4) wire full duplex system with a dedicated connection to each slave device 106.

In some implementations, the slave devices can be connected to a second master device in parallel (Block 1030). The slave devices can also be separately connected to the second master device (Block 1040). For example, with continuing reference to FIGS. 1 through 9, two or more communications/control modules 126 can be used to implement a redundant HDLC data link layer protocol. It should be noted that connecting the slave devices to a second master device is provided by way of example only and is not meant to be restrictive of the present disclosure. Thus, the slave devices may be connected to more than two master devices in parallel and/or separately.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A switch fabric comprising:
a plurality of slave devices;
a master device configured to be connected in parallel with the plurality of slave devices; and
a support frame to facilitate interconnection of the plurality of slave devices and the master device, the support frame comprising a plurality of slots, each slot of the plurality of slots for receiving a respective one of the plurality of slave devices, wherein a slave device coupled with the support frame at a respective slot is configured to identify itself to the master device using a unique identification, the unique identification including at least one of an identifier associated with the slave device or an identifier associated with the respective slot.

2. The switch fabric as recited in claim 1, further comprising a parallel communications interface for separately connecting the plurality of slave devices to the master device, the parallel communications interface comprising a dedicated parallel communications channel for each one of the plurality of slave devices.

3. The switch fabric as recited in claim 1, further comprising a serial communications interface for connecting the plurality of slave devices to the master device, the serial communications interface comprising a multidrop bus.

4. The switch fabric as recited in claim 1, further comprising a parallel communications interface for separately connecting the plurality of slave devices to the master device, the parallel communications interface comprising a cross switch.

5. The switch fabric as recited in claim 1, further comprising a serial communications interface for connecting the plurality of slave devices to the master device and a parallel communications interface for separately connecting the plurality of slave devices to the master device, the serial communications interface and the parallel communications interface formed on a single printed circuit board.

6. The switch fabric as recited in claim 1, further comprising a serial communications interface for connecting the plurality of slave devices to the master device and a parallel communications interface for separately connecting the plurality of slave devices to the master device, the serial communications interface configured for connecting the plurality of slave devices to a second master device in parallel, and the parallel communications interface configured for separately connecting the plurality of slave devices to the second master device.

7. The switch fabric as recited in claim 1, wherein information transmitted via at least one of the serial communications interface or the parallel communications interface is packetized.

8. The switch fabric as recited in claim 1, further comprising a network interface for transmitting information collected from the plurality of slave devices via a network.

9. A switch assembly comprising:
a plurality of slave devices;
a master device;
a cross switch for separately connecting the plurality of slave devices to the master device, the cross switch configured for simultaneously transmitting information between the plurality of slave devices and the master device and transmitting information between individual ones of the plurality of slave devices; and
a support frame to facilitate interconnection of the plurality of slave devices and the master device, the support frame comprising a plurality of slots, each slot of the plurality of slots for receiving a respective one of the plurality of slave devices, wherein a slave device coupled with the support frame at a respective slot configured to identify itself to the master device using a unique identification associated with the respective slot, the unique identification including at least one of an identifier associated with the slave device or an identifier associated with the respective slot.

10. The switch assembly as recited in claim 9, further comprising a multidrop bus for connecting a plurality of slave devices to a master device in parallel, the multidrop bus and the cross switch formed on a single printed circuit board.

11. The switch assembly as recited in claim 9, further comprising a multidrop bus for connecting a plurality of slave devices to a master device in parallel, the multidrop bus configured for connecting the plurality of slave devices to a second master device in parallel, the cross switch configured for separately connecting the plurality of slave devices to the second master device.

12. The switch assembly as recited in claim 9, further comprising a multidrop bus for connecting a plurality of slave devices to a master device in parallel, with information transmitted via at least one of the multidrop bus or the cross switch being packetized.

13. The switch assembly as recited in claim 9, further comprising a network interface for transmitting information collected from the plurality of slave devices via a network.

* * * * *